(12) United States Patent
    Takeda

(10) Patent No.: US 7,936,761 B2
(45) Date of Patent: May 3, 2011

(54) COMMUNICATION EQUIPMENT, COMMUNICATION CONTROL EQUIPMENT, AND COMMUNICATION SYSTEM

(75) Inventor: Yukiko Takeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 761 days.

(21) Appl. No.: 11/184,837

(22) Filed: Jul. 20, 2005

(65) Prior Publication Data

US 2006/0176907 A1    Aug. 10, 2006

(30) Foreign Application Priority Data

Feb. 9, 2005 (JP) .................. 2005-032457

(51) Int. Cl.
*H04L 12/28* (2006.01)

(52) U.S. Cl. ............. 370/395.21; 370/229; 370/468; 370/252; 370/338

(58) Field of Classification Search ........... 370/252, 370/338
See application file for complete search history.

(56) References Cited

U.S. PATENT DOCUMENTS

| 7,068,625 | B1 * | 6/2006 | Schindler et al. ............. 370/331 |
| 7,068,635 | B2 * | 6/2006 | Dempo ........................ 370/338 |
| 2005/0213509 | A1 * | 9/2005 | Collomb et al. ............. 370/252 |
| 2006/0135158 | A1 * | 6/2006 | Lee et al. ................... 455/435.1 |

FOREIGN PATENT DOCUMENTS

WO    WO04/001520    * 12/2003

OTHER PUBLICATIONS

Johnson et al., "Mobility Support in IPv6", Network Working Group, Standards Track, Jun. 2004, pp. 1-18.
Narten et al., "Neighbor Discovery for IP Version 6 (IPv6)", Network Working Group, Standards Track, Dec. 1998, pp. 1-17.
Rosenberg et al., "SIP: Session Initiation Protocol", Network Working Group, Standards Track, Jun. 2002, pp. 1-18.
"All-IP Core Network Multimedia Domain, IP Multimedia Subsystem—Stage 2", $3^{rd}$ Generation Partnership Project 2, Dec. 2003, pp. i-v and 18-20.
"IP Network Architecture Model for cdma2000 Spread Spectrum Systems", $3^{rd}$ Generation Partnership Project 2, Aug. 2003, pp. i-iv and 22-23.

* cited by examiner

*Primary Examiner* — Dang T Ton
*Assistant Examiner* — Pamit Kaur
(74) *Attorney, Agent, or Firm* — Stites & Harbison PLLC; Juan Carlos A. Marquez, Esq.

(57) ABSTRACT

Mobile IPv6 guarantees reachability of a MN by giving the home address (HoA) to the MN. A Mobile-IPv6-compliant application of the MN performs communication without using a Care of Address (CoA), and therefore does not notify the CoA to other communication equipment. For this reason, a PDSN can provide QoS control using HoA of the MN, but cannot provide QoS control using the address (CoA) of a visited network of the MN. A QoS control function of the PDSN has means of acquiring Binding information of the MN (correspondence information between HoA and CoA), and notifying it to a PDF. The PDF transmits QoS parameters that contain the CoA of the MN to the PDSN by referring to the Binding information. By this configuration, it becomes possible for the PDSN to perform QoS control using the CoA of the MN.

3 Claims, 20 Drawing Sheets

FIG.8

220 QoS INFORMATION MANAGEMENT TABLE (PDSN)

| 221 | 222 | 223 | 224 | 225 | 226 | 227 | |
|---|---|---|---|---|---|---|---|
| token | SOURCE IP ADDRESS | SOURCE PORT | QoS CLASS | ON/OFF | DEST. IP ADDRESS | DEST. PORT | |
| 111@pcscf | coa#1 | 4004 | high | on | cn | 6002 | 220-1 |
| | | | | | | | 220-2 |
| | | | | | | | 220-n |

FIG.11A

210 MN INFORMATION MANAGEMENT TABLE (PDF)

| MN HOME ADDRESS (211) | MN CARE OF ADDRESS (212) | EXPIRATION (213) | |
|---|---|---|---|
| hoa | coa#1 | | | 210-1
| | | | | 210-2
| | | | | 210-n

FIG.11B

830 QoS INFORMATION MANAGEMEMENT TABLE (PDF)

| Token (831) | O-c (832) | O-m (833) | O-a (834) | O-b (835) | CoA YES OR NO (836) | T-c (837) | T-m (838) | T-a (839) | T-b (840) | CoA YES OR NO (841) | QoS CLASS (842) | |
|---|---|---|---|---|---|---|---|---|---|---|---|---|
| 111@pcscf | hoa | 4004 audio | | | Yes | cn | 6002 audio | | | No | high | 830-1
| | | | | | | | | | | | | 830-2
| | | | | | | | | | | | | 830-n

FIG.11C

850 QoS CLASS TABLE (PDF)

| MEDIA (851) | QoS CLASS (852) | |
|---|---|---|
| audio | high | | 850-1
| | | | 850-2
| | | | 850-n

FIG. 13A

800 SESSION INFORMATION MANAGEMENT TABLE (P-CSCF)

| CALL-ID | TO TAG | FROM TAG | O-c | O-m | O-a | O-b | T-c | T-m | T-a | T-b | Token | PDF id | |
|---|---|---|---|---|---|---|---|---|---|---|---|---|---|
| 321@hoa | 1234 | 5678 | hoa | 4004 audio | | | cn | 6002 audio | | | 111@ pcscf | pdf1 | 800-1 |
| | | | | | | | | | | | | | 800-2 |
| | | | | | | | | | | | | | 800-n |

Column numbers: 801, 802, 803, 804, 805, 806, 807, 808, 809, 810, 811, 812, 813

FIG. 13B

820 MN INFORMATION MANAGEMENT TABLE (P-CSCF)

| MN HOME ADDRESS (821) | MN CARE OF ADDRESS (822) | EXPIRATION (823) | |
|---|---|---|---|
| hoa | coa#1 | | 820-1 |
| | | | 820-2 |
| | | | 820-n |

FIG. 13C

870 SESSION INFORMATION MANAGEMENT TABLE (P-CSCF)

| CALL-ID | TO TAG | FROM TAG | O-c | O-m | O-a | O-b | CoA YES OR NO | T-c | T-m | T-a | T-b | CoA YES OR NO | Token | PDF id | |
|---|---|---|---|---|---|---|---|---|---|---|---|---|---|---|---|
| 321@hoa | 1234 | 5678 | hoa | 4004 audio | | | | cn | 6002 audio | | | | 111@ pcscf | pdf1 | 870-1 |
| | | | | | | | | | | | | | | | 870-2 |
| | | | | | | | | | | | | | | | 870-n |

Column numbers: 801, 802, 803, 804, 805, 806, 807, 871, 808, 809, 810, 811, 872, 812, 813

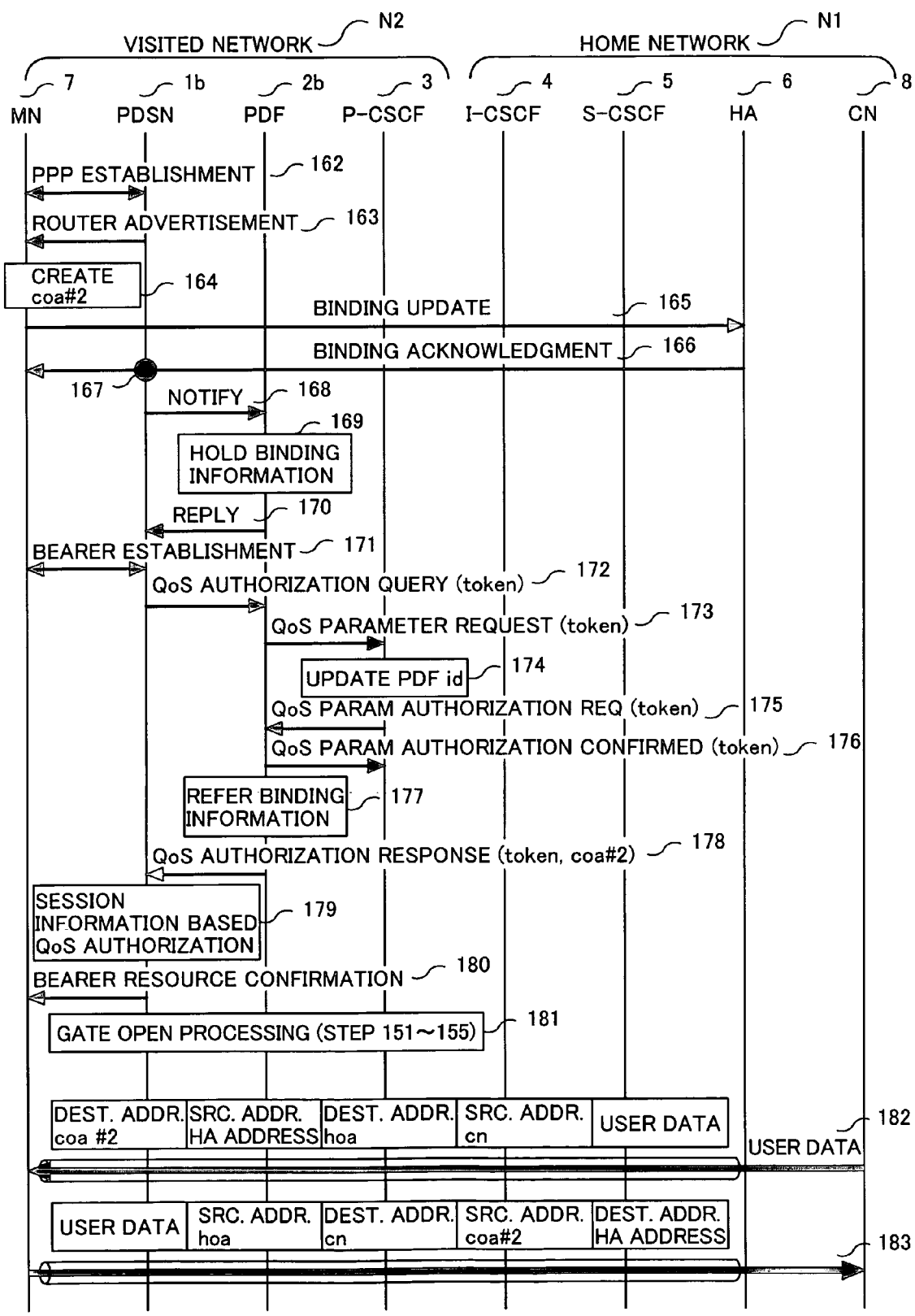

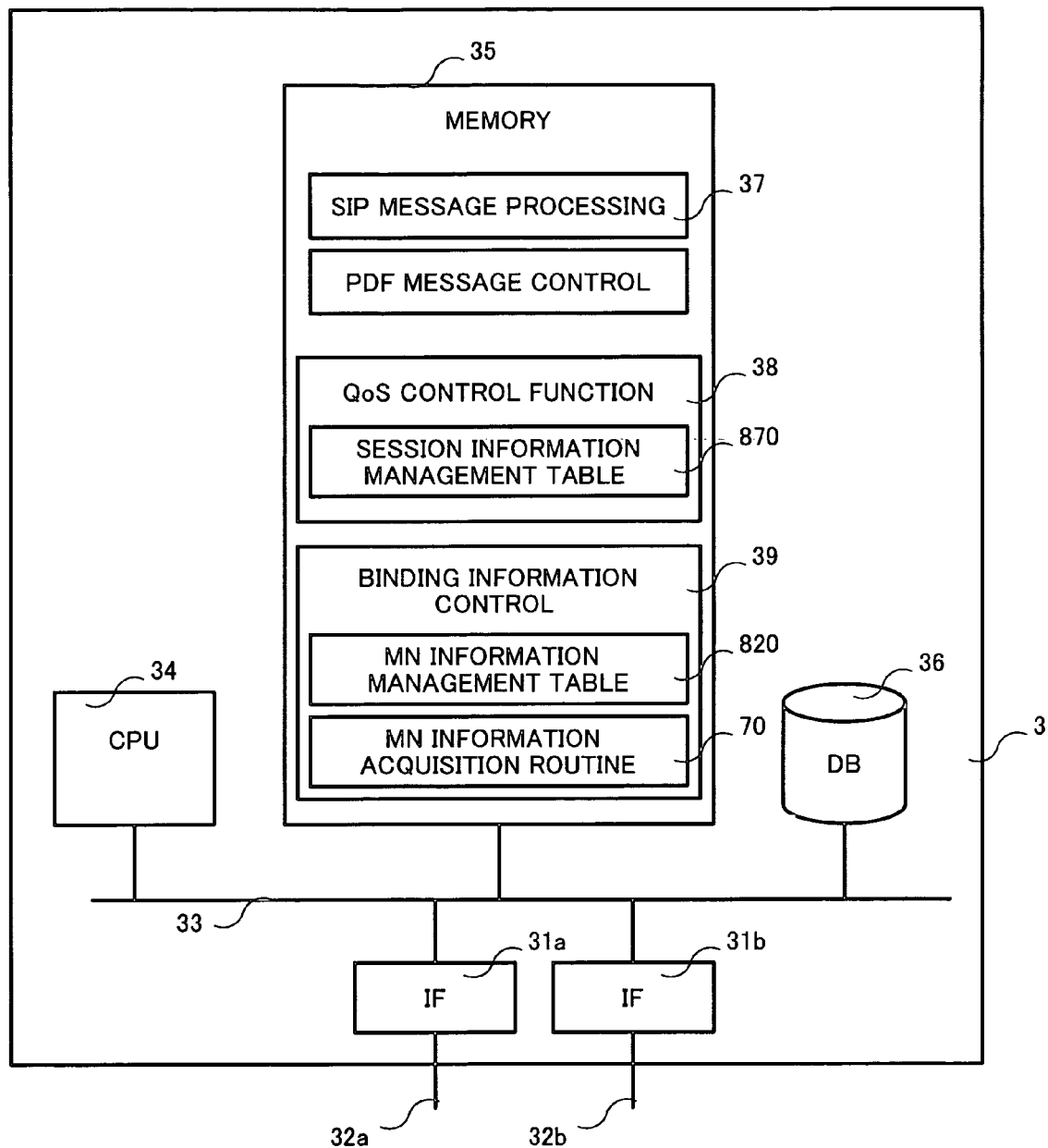

COMMUNICATION EQUIPMENT, COMMUNICATION CONTROL EQUIPMENT, AND COMMUNICATION SYSTEM

CLAIM OF PRIORITY

The present application claims priority from Japanese application JP 2005-032457 filed on Feb. 9, 2005, the content of which is hereby incorporated by reference into this application.

FIELD OF THE INVENTION

This invention relates to communication equipment connected to a network, communication control equipment, a communication system, and a method for controlling communication, and more particularly, to mobile communication control equipment and a method for controlling QoS of communication. To be more specific, this invention relates to mobile communication control equipment in a mobile communication system to which a Mobile IP protocol is applied and communication control equipment in a communication system to which a SIP protocol is applied.

BACKGROUND OF THE INVENTION

Recently, examination of a method of constructing a mobile communication network using IP (Internet Protocol) is becoming very active. IETF (Internet Engineering Task Force) has defined a Mobile IPv6 specification (for example, see Non-patent document 1). Network constituent components of Mobile IPv6 are a Mobile Node (MN), a Home Agent (HA), and a Correspondent Node (CN). The MN is given a unique IP address (home address) that does not change even when the MN moves. A link with the same prefix as the home address is called a home link. A prefix indicates a network portion of the IP address.

When the MN moves to a link other than the home link (the link to which the MN moved is called a foreign link), the MN acquires an IP address in the foreign link. This address is called a Care of Address (hereinafter expressed by CoA). Any application of the MN communicates using the home address. Any application of the MN can communicate without using a Care of Address.

When the MN moved to a foreign link, the MN receives a Router Advertisement that a router existing in the foreign link transmits periodically. By detecting a prefix contained in this Router Advertisement that is different from the home address, the MN detects movement from the home link to the foreign link. A Router Advertisement message is prescribed by "Neighbor Discovery" of IPv6 (see Non-patent document 2). The message is used in order that the router notifies its existence to other nodes on the same link.

When the MN detects movement, the MN performs registration to the HA. The HA holds correspondence information (Binding information) between a home address of the MN existing anywhere than in its home link and a Care of Address received at the time of registration in Binding Cache. Next, in order to acquire a packet transmitted from the CN to the home address of the MN, the HA operates as a proxy of the MN.

A procedure in which CN transmits a packet to the destination of the MN will be explained below. The CN transmits a packet to a destination of the home address of the MN. The HA acquires the packet destined to the home address of the MN. The HA searches for the Binding Cache and acquires the CoA corresponding to the home address of the MN. The HA adds an IP header destined to the corresponding CoA to the packet that was received (encapsulation), and transmits the packet. When the MN receives the above-mentioned packet destined to the CoA, the MN will remove the IP header that was added previously (de-encapsulation) to reconstruct the original packet. The MN may perform route optimization by notifying the CN of the MN's own Binding information.

Moreover, SIP (Session Initiation Protocol) (see Non-patent document 3) attracts attention as a session control protocol in an IP network. The SIP is a protocol for controlling a session of IP multimedia communication that is made into the specification by IETF. As a typical service that uses the SIP, there is VoIP (Voice over IP). The VoIP is a technology whereby voice information is transmitted and received on the IP network. In the VoIP communication using the SIP, a virtual communication path (session) is established between two pieces of the communication equipment before a communication starts. Voice data that was converted into an IP packet is forwarded on the established communication path. In VoIP communication, the SIP controls session establishment, maintenance, and session release between two pieces of communication equipment. Media information, including the attribute of voice data etc., is determined at the time of session establishment. The communication equipment notifies media information by a SDP (Session Description Protocol) contained in an SIP message. By the SDP, various information about a session including, for example, an IP address, a port number, a media type, etc. can be described.

On the other hand, in 3GPP2 (Third Generation Partnership Project 2), standardization of the third generation mobile communication (hereinafter referred to as 3G) that uses cdma2000 1× for a radio interface is progressing. A 3G network consists of a radio access network (RAN: Radio Access Network) and a core network (CN: Core Network). The RAN controls a radio transmission function, and terminates it. The RAN usually consists of a base station and base station controller. The CN performs mobility control, call control, and service control. The CN provides a circuit switching service and a packet switching service. A function of CN for providing the circuit switching service is called a circuit switched domain. A function of CN for providing the packet switching service is called a packet switched domain. A PDSN (Packet Data Serving Node) of the packet switched domain establishes a PPP connection between itself and the MN, and forwards an IP packet that is transmitted and received between itself and an external IP network. A Mobile IP technology is applied to a 3G network that the 3GPP2 specifies.

Further, for the 3GPP2, examination of implementing the 3G network based on the All IP network architecture is advancing. In an All-IP network, an IMS (IP multimedia subsystem) is connected to a packet switched domain. A CSCF (Call State Control Function) performs session control of the All-IP network. The CSCF is divided roughly into three kinds (P-CSCF, I-CSCF, S-CSCF) by its role. A P-CSCF (Proxy-CSCF) is CSCF that the MN accesses first. An I-CSCF (Interrogating-CSCF) specifies an S-CSCF when the MN existing in a visited network accesses an SIP server in the home network. An S-CSCF (Serving-CSCF) exists in the home network, and controls and manages a session state. SIP is used for a session control protocol (for example, see Non-patent document 4). A PDF (Policy Decision Function) is a functional entity for controlling QoS in the IMS. The PDF communicates with the PDSN and the P-CSCF, and provides a QoS control function (for example, see Non-patent document 5).

[Non-patent document 1]
IETF RFC3775, Mobility Support in IPv6 , Section 4.1

[Non-patent document 2]
IETF RFC2461, Neighbor Discovery for IP Version 6 (IPv6), Section 3
[Non-patent document 3]
IETF RFC3261, SIP: Session Initiation Protocol, Section 4
[Non-patent document 4]
3GPP2 X.S0013-002-0 v1.0, All-IP Core Network Multimedia Domain, Section 4.6
[Non-patent document 5]
3GPP2 S.R0037-0 v3.0, IP Network Architecture Model for cdma2000 Spread Spectrum Systems, p. 22

SUMMARY OF THE INVENTION

In the conventional Mobile IP communication system, an application of a mobile terminal performs communication using the home address and does not use a Care of Address. Therefore, the application of the mobile terminal does not notify the Care of Address to communication equipment, such as the CSCF. A method of providing QoS control when the Mobile-IPv6-compliant MN establishes a session, which may be assumable when the conventional technology is used, becomes as follows. First, the MN establishes PPP between itself and THE PDSN and acquires a Care of Address. Next, the MN registers a Mobile IP in the HA. The MN performs SIP registration to the S-CSCF via the P-CSCF and the I-CSCF. Although there was a case where this SIP registration contains an IP address of the MN, an IP address that is notified is the home address.

Next, the MN requests the P-CSCF to establish an SIP session. Although there was the case where this establishment request of the SIP session contains an IP address of a mobile terminal, the IP address that was notified was the home address. When the P-CSCF receives an inquiry of a QoS control parameter from the PDF, the P-CSCF will notify the PDF of a parameter used for QoS control. The PDF transmits QoS control information to the PDSN. Although there was a case where this QoS control information contains an IP address of the MN, the IP address that was notified was the home address. Therefore, when the PDSN provides QoS control based on an IP address of the MN, the PDSN will use the home address as its IP address. For this reason, there is a problem that the PDSN cannot provide QoS control according to the Care of Address of the MN (for example, packet filtering, priority control of packet forwarding, etc.).

For example, there was even the case where the PDSN used the IP address as a condition of packet filtering, the IP address was the home address. For this reason, when the PDSN received a packet whose Care of Address is set to a source address of the IP packet or destination address of the IP packet, it does not satisfy the conditions of packet filtering. Therefore, there was a problem that executing filtering was impossible.

For example, there was also the case where IP address was used as a condition of determination of the priority when the PDSN determined the priority of packet forwarding. That IP address was the home address. For this reason, there was a problem that, when receiving a packet whose Care of Address was set to a source address of the IP packet or to a destination address of the IP address, priority of the packet could not be determined.

The object of this invention is to provide QoS control of a packet that a Mobile-IP-compliant mobile terminal transmits and receives. More specifically, the object is to provide a communication method of performing QoS control of a packet that a Mobile-IP-compliant mobile terminal existing anywhere than in its home network transmits and receives.

To solve the problem, this invention comprises the following means. That is, (1) the communication equipment accommodating a radio access network comprises means for acquiring registration information of the Mobile IP and means for notifying the acquired registration information of the Mobile IP to communication equipment equipped with the QoS control function. When the communication equipment accommodating the radio access network acquired registration information of the Mobile IP, it notifies registration information of a corresponding mobile terminal to the communication equipment equipped with the QoS control function. The communication equipment equipped with the QoS control function comprises means for receiving information of QoS parameters from the communication equipment equipped with the SIP communication function, means for generating QoS control information, and means for notifying the control information to the communication equipment equipped with a function of accommodating the radio access network. The communication equipment equipped with the QoS control function generates QoS control information by referring to information of the QoS parameter received from the communication function equipped with the SIP communication function and the registration information of the Mobile IP.

(2) Alternatively, the communication equipment equipped with a SIP communication function comprises means for acquiring registration information of a Mobile-IP-compliant mobile terminal and means for generating QoS parameters. The communication equipment generates the QoS parameter by referring to the SIP message that is transmitted and received and the Binding information. When the communication equipment receives a QoS Parameter Request from the communication equipment equipped with the QoS control function, the communication equipment will notify the generated QoS parameter.

This invention provides a method for controlling communication and communication equipment for providing a communication service that provides communication service (for example, packet filtering and packet priority control) to which QoS control is applied to a Mobile-IP-compliant mobile terminal in a visited network. Especially, the communication equipment accommodating a radio access network notifies the Mobile IP registration to communication equipment equipped with the QoS control function, and the communication equipment equipped with the QoS control function generates QoS parameters by referring to registration information of the Mobile IP. By this operation, for example, it becomes possible to use the Care of Address of the Mobile-IP-compliant mobile terminal as QoS parameters for specifying conditions of packet filtering and packet priority control. That is, providing QoS control according to the Care of Address of the Mobile-IP-compliant mobile terminal becomes possible.

Alternatively, communication equipment equipped with a SIP communication function generates QoS parameters by referring to registration information of the Mobile IP and notifies the QoS parameter to the communication equipment equipped with the QoS control function. By this operation, it becomes possible to use a Care of Address of the Mobile-IP-compliant mobile terminal as QoS parameters that indicate conditions of packet filtering and packet priority control. That is, providing QoS control according to the Care of Address of the Mobile-IP-compliant mobile terminal becomes possible.

BRIEF DESCRIPTION OF THE DRAWINGS

FIG. 8 is a diagram of a QoS information management table that the PDSN 1 has;

FIG. 11A is a diagram of an MN information management table that the PDF 2 has;

FIG. 11B is a diagram of a QoS information management table that the PDF 2 has;

FIG. 11C is a diagram of a QoS class table that the PDF 2 has;

FIG. 13A is a diagram of a session information management table that the P-CSCF 3 has in the first embodiment;

FIG. 13B is a diagram of an MN information management table that the P-CSCF 3 has in the second embodiment;

FIG. 13C is a diagram of a session information management table that the P-CSCF 3 has in the second embodiment;

FIG. 14 is a diagram of a registration and transmission sequence in the first embodiment;

FIG. 15 is a block diagram of the P-CSCF 3 in the second embodiment;

DETAILED DESCRIPTION OF THE PREFERRED EMBODIMENT

First Embodiment

A first embodiment of this invention will be described using the attached drawings. As a typical example, a communication method performed when a Mobile-IPv6 -compliant mobile node (MN) moved to any network other than its home network (hereinafter referred to as a visited network) will be described in detail.

Figure 1:
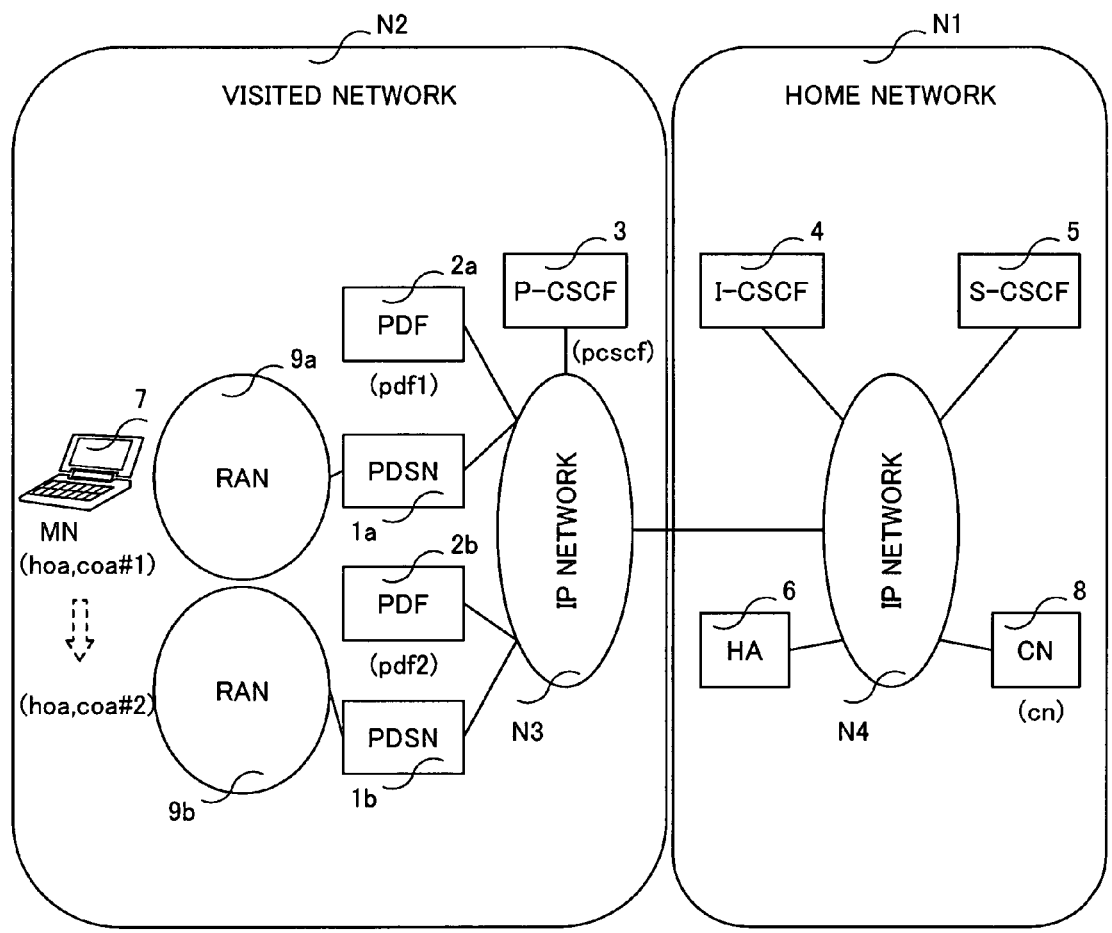
FIG. 1 is a configuration diagram showing an example of a configuration of a communication network in this invention.

FIG. 1 is a configuration example of a communication network in this invention. The communication network in this invention consists of a home network N1 of the MN 7 (mobile node) and a visited network N2. In this embodiment, the home network N1 and the visited network N2 are both IPv6 networks. The MN 7 is a mobile node (MN) that supports Mobile IPv6. However, the home network N1 and the visited network N2 may be IPv4 networks or other networks and the MN 7 may be a terminal that conforms to Mobile IPv4 or other protocols provided that a configuration can play an effect of this invention. The visited network N2 and the home network N1 are connected via a router or a gateway apparatus. The home network N1 has an I-CSCF 4, an S-CSCF 5, and the HA 6. The I-CSCF 4, the S-CSCF 5, and the HA 6 are connected to an IP network N4. The visited network N2 has the radio access network (RAN) 9 (9a, 9b), a PDSN 1, a PDF 2, and a P-CSCF 3. The PDSN 1, the PDF 2, and the P-CSCF 3 are connected to an IP network N3.

The PDSN 1 provides a function of forwarding a user IP packet that is transmitted and received between the MN and an external IP network. The PDF 2 communicates with the PDSN 1 and the P-CSCF 3, and provides the QoS control function. Each of the P-CSCF 3, the I-CSCF 4, and the S-CSCF 5 is equipped with a session control function. The P-CSCF 3 is a CSCF that the MN 7 accesses first. The I-CSCF 4 is equipped with a function of specifying an S-CSCF of the MN existing in the visited network. The S-CSCF 5 is equipped with a function of controlling and managing a session state of the MN 7.

The HA 6 is a Mobile-IPv6-compliant Home Agent (the HA). The HA 6 manages location information of the MN 7. The location information is Binding information of the home address of the MN and the Care of Address thereof. The HA 6 is equipped with a function of acquiring a packet that the Correspondent Node terminal transmits to the home address of the MN 7 and forwarding the packet to the MN 7 existing in the visited network N2.

The MN 7 is equipped with a function of the Mobile-IP-compliant mobile terminal and a function of processing the SIP protocol. The MN 7 holds SIP URI as an SIP identifier.

Figure 2:
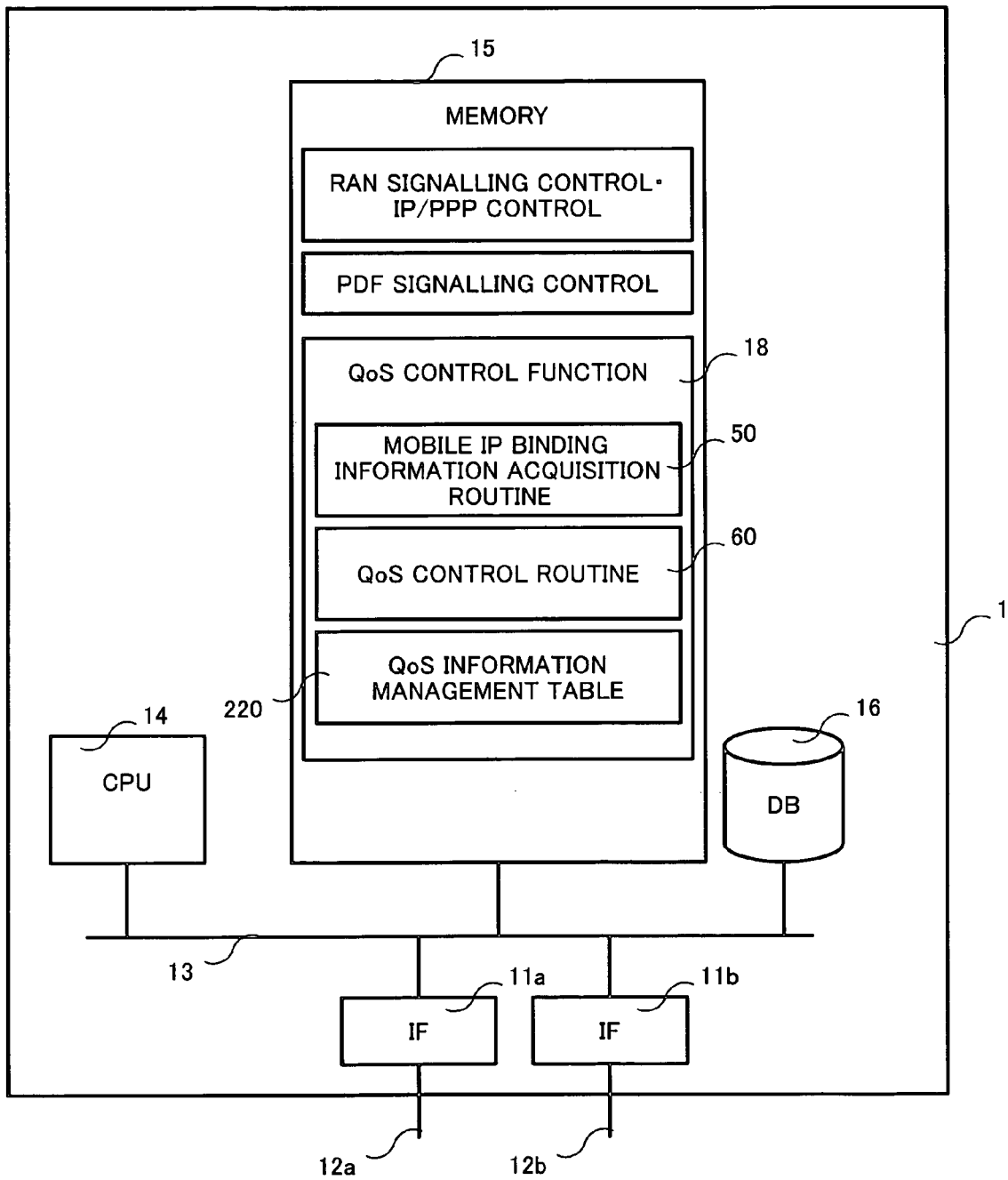
FIG. 2 is a block diagram of a PDSN 1.

FIG. 2 shows an example of a composition of the PDSN 1. The PDSN 1 consists of an interface unit (IF) 11 (11a, 11b) for accommodating connection of the circuit 12 (12a, 12b), a CPU 14, memory 15, and a database 16. The constituent components are connected via a bus 13.

The memory 15 stores a program for executing RAN signal control and IP/PPP control, a program for executing PDF signal control, and a program for executing the QoS control function 18. A program for RAN signal control and IP/PPP control has a function of transmitting or receiving a signal to and from communication equipment existing in RAN, and a function of transmitting or receiving IP/PPP to and from the terminal. A program for PDF signaling control has a function of transmitting or receiving a signal to and from the PDF. The QoS control function 18 contains a Mobile-IP Binding information acquisition routine 50, a QoS control routine 60, and the QoS information management table 220 used to perform QoS control of traffic. The database 16 may contain the QoS information management table 220.

Because the PDSN 1 is equipped with the Mobile-IP Binding information acquisition routine 50, the PDSN 1 is enabled to notify the PDF 2 of the Binding information of the MN (correspondence information between a home address and a Care of Address). Because the PDSN 1 is equipped with the QoS information management table 220 and the QoS control routine 60, the PDSN 1 can perform QoS control of a packet (for example, packet filtering and packet priority control) that passes through a PDSN 1a.

FIG. 8 is an example of a table composition of the QoS information management table 220. When the PDSN 1 performs QoS control, such as packet priority control and packet filtering, the PDSN 1 refers to the QoS information management table 220. The QoS information management table 220 stores a correspondence relationship among a source IP address 222, a source port number 223, a QoS Class 224, and On/Off 225 indicating an occupied/unoccupied state of a port, at least for a Token 221 that identifies a session between terminals. The QoS information management table 220 may contain a destination IP address 226 and a destination port number 227. When the QoS information management table 220 contains a destination IP address 226 and a destination port number 227, the PDSN 1 can manage the occupied/unoccupied state of a port according to a destination IP address and a destination port number.

Figure 3:
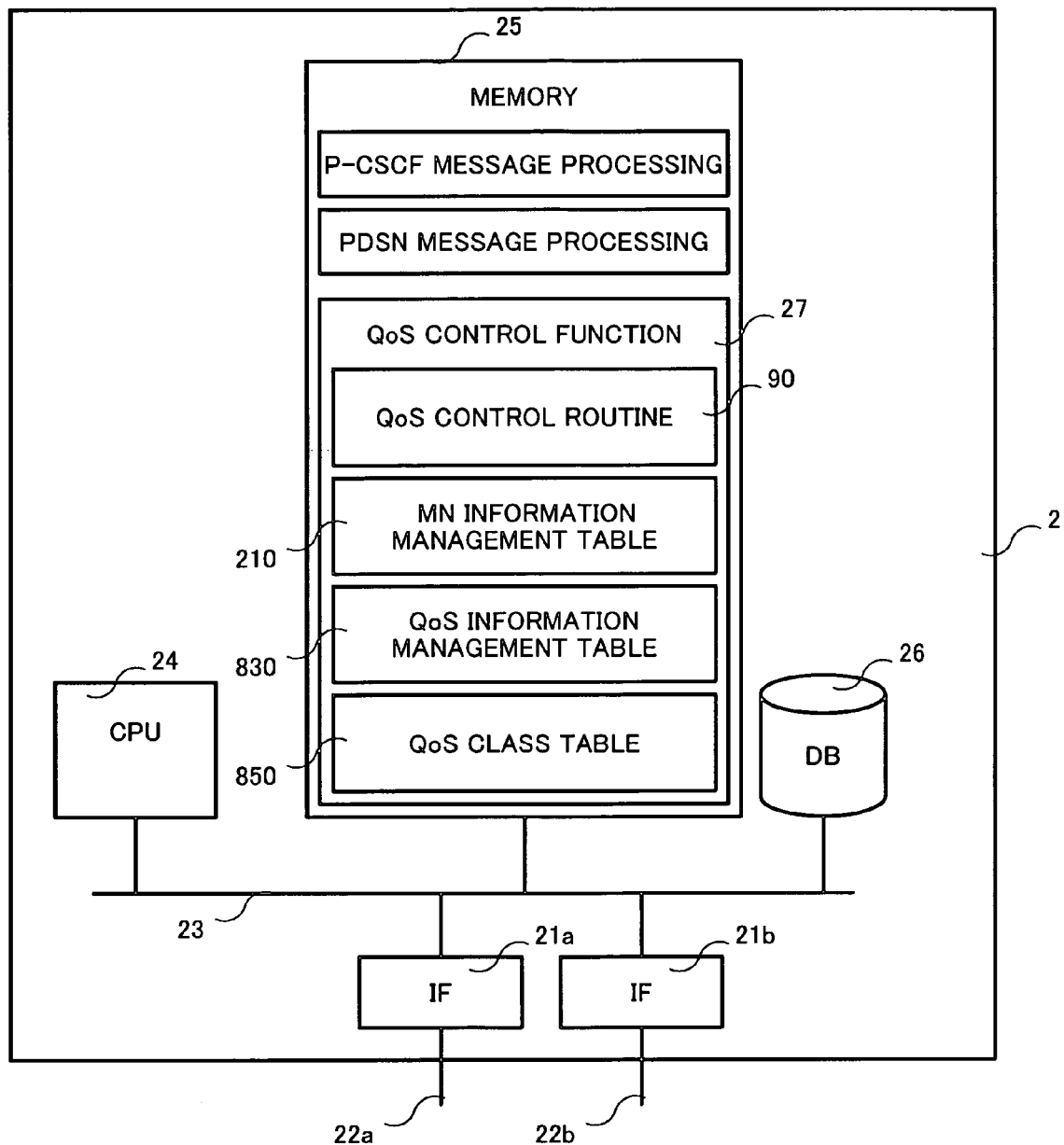
FIG. 3 is a block diagram of a PDF 2.

FIG. 3 shows an example of a composition of the PDF 2. The PDF 2 consists of an interface unit (IF) 21 (21a, 21b) for accommodating connection of a circuit 22 (22a, 22b), a CPU 24, memory 25, and a database 26. The constituent components are connected via a bus 23.

The memory 25 stores a program for executing P-CSCF message processing, a program for executing PDSN message processing, and a program for executing the QoS control function 27. The program for P-CSCF message processing is equipped with a function of transmitting or receiving a message between P-CSCF and the PDF. The program for PDSN message processing is equipped with a function of transmitting or receiving a message between the PDF and the PDSN. The QoS control function 27 contains the QoS control routine 90, the MN information management table 210, the QoS information management table 830, and the QoS class table 850. The database 26 may contain the MN information management table 210, the QoS information management table 830, and the QoS class table 850. Because the PDF is equipped with the MN information management table 210, a QoS control routine 90, and a QoS information management table 830, the PDF is enabled to read the Care of Address of the MN 7 from the corresponding entry on the MN information management table 210 and set the QoS parameter to the Care of Address when transmitting the QoS parameter to the PDSN.

FIG. 11A is an example of a table composition of the MN information management table 210. The MN information management table 210 stores a home address 211 of the MN and at least a correspondence relationship between the home address 211 and a Care of Address (CoA) 212 that the MN acquired in the visited network. For example, a correspondence relationship between the home address (hoa) and a Care of Address (coa#1) is stored in an entry 210-1. The MN information management table 210 may contain expiration 213 indicating a term of validity of the Binding Cache. When the MN information management table 210 contains the expiration 213, the PDF 2 can delete an entry whose term of validity was expired from the table.

FIG. 11B is an example of a table composition of the QoS information management table 830. The QoS information management table 830 stores the following: the Token 831; an IP address (O-c) 832, a port number, and media information (O-m) 838 of the caller; existence of the caller's Care of Address 836; an IP address (T-c) 837, a port number, and media information (T-m) 838 of the callee; existence of the callee's Care of Address 841; and a correspondence relationship with a QoS class 842.

Because the QoS information management table 830 contains a care-of-address existence field 836, 841, the PDF 2 is enabled to manage the existence of the Care of Address of the MN. When a Care of Address exists, it becomes possible for the PDF 2 to set QoS parameters that the PDF 2 sends to the PDSN 1 to the Care of Address. The QoS information management table 830 may contain an attribute of the caller (O-a) 834, bandwidth information of the caller (O-b) 835, an attribute of the callee (T-a) 839, and bandwidth information of the callee (T-b) 840. When the QoS management table 830 contains O-a 834 and T-a 839, the PDF 2 can specify an attribute (transmission possible, reception possible, transmission and reception possible) related to packet transmission and reception. When the QoS management table 830 contains O-b 835 and T-b 840, the PDF 2 can specify a band used for the communication.

FIG. 11C is an example of a table composition of a QoS class table 850. A QoS class table 850 stores a relationship between a media type 851 and a QoS class indicating a priority 852. For example, an entry 850-1 stores a correspondence relationship between media (audio) and QoS class (high).

Figure 4:
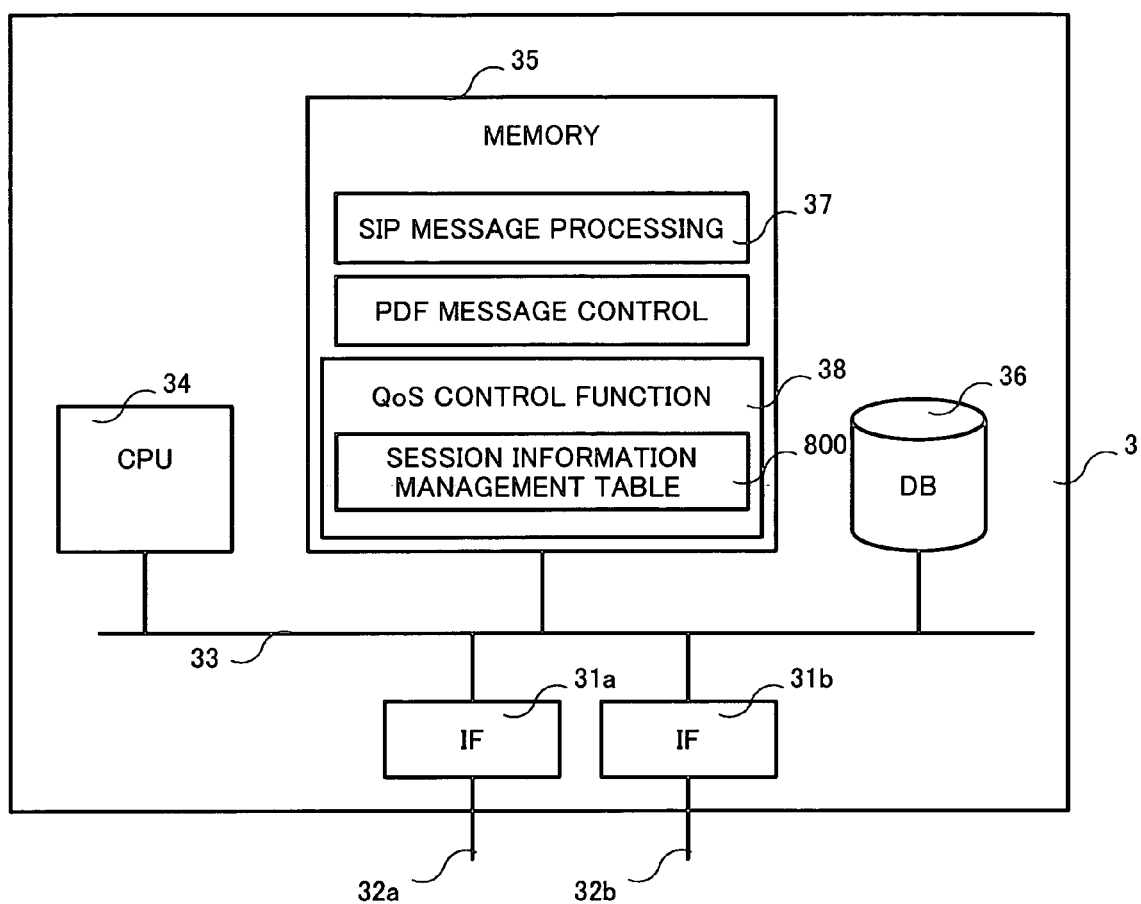
FIG. 4 is a block diagram of a P-CSCF 3.

FIG. 4 shows an example of a configuration of the P-CSCF 3. The P-CSCF 3 consists of an interface unit (IF) 31 (21a, 31b) for accommodating connection of a circuit 32 (32a, 32b), a CPU 34, memory 35, and a database 36. The constituent components are connected via a bus 33. The memory 35 stores a program for executing SIP message processing 37, a program for executing PDF message processing, and a program for executing a QoS control function 38. The program for SIP message processing 37 is equipped with a function of transmitting or receiving the SIP message. The program for PDF message processing is equipped with a function of transmitting or receiving a message between the P-CSCF and the PDF. The QoS control function 38 contains a session information management table 800. The database 36 may contain the session information management table 800.

FIG. 13A is an example of a table composition of the session information management table 800. The session information management table 800 stores a correspondence relationship among: IP address information of the caller (O-c) 804, a port number and media classification (O-m) 805 of the caller, IP address information of the callee (T-c) 808, a port number and media classification (T-m) 809 of the callee, a Token 812, and a PDF id 813. The session information management table 800 may contain an attribute of the caller (O-a) 806, bandwidth information of the caller (O-b) 807, an attribute of the callee (T-a) 810, and bandwidth information of the callee (T-b) 811. The P-CSCF 3 uses these fields when a corresponding parameter is set in a message-body part of the SIP message.

When the session information management table 800 contains O-a 806 and T-a 810, the P-CSCF 3 can specify attribute information (send only, receive only, send receive, etc.). When the session information management table 800 contains O-b 807 and T-b 811, the P-CSCF 3 can specify bandwidth information.

Next, an IPv6 packet format will be explained. An IPv6 packet is composed of an IPv6 basic header, an extension header following this, and a payload following these headers. This IPv6 basic header contains a source address and a destination address. The IPv6 packet format will be explained using the IPv6 packet that conforms to this format. However, as long as an effect of this invention is played, a packet that conforms to other protocol than IPv6, for example, IPv4 may be used.

Next, a packet format containing the SIP message will be explained. The SIP message is stored in a data part of a transport protocol, such as TCP/UDP. The header and data part of the transport protocol are stored in the payload of the IPv6 packet format. Next, a format of the SIP message will be explained. The SIP message consists of at least a start-line indicating a request or response and a message-header in which parameters of the SIP message are set up. When the SIP message is used to transmit media information used for communication between terminals, the SIP message contains a message-body for storing media information etc.

Next, a format of a packet containing a Binding Update message will be explained. The packet containing a Binding Update message consists of a Destination Options Header and an IPv6 Mobility Header. These headers are stored in an extension header of the IPv6 packet. The following values are stored in the Binding Update that the MN 7 transmits to the HA 6. A destination address of an IPv6 packet header is set to an address of the HA 6. The Care of Address of the MN 7 is stored in source address of the IPv6 packet header. When a value other than the home address of the MN 7 is stored in source address, the home address of the MN 7 is stored in a Destination Options Header.

Next, a format of a packet containing a Binding Acknowledgement message will be explained. A packet containing the Binding Acknowledgement message is composed of a Routing Header and an IPv6 Mobility Header. These headers are stored in the extension header of the IPv6 packet. The following values are stored in the Binding Acknowledgement that the HA 6 transmits to the MN 7. A source address of the IPv6 packet header is set to the address of the HA 6. The Care of Address of the MN 7 is stored in destination address of the IPv6 packet header. When a value other than the home address of the MN 7 is stored in destination address, the home address of the MN 7 is stored in the Routing Header.

Figure 5:
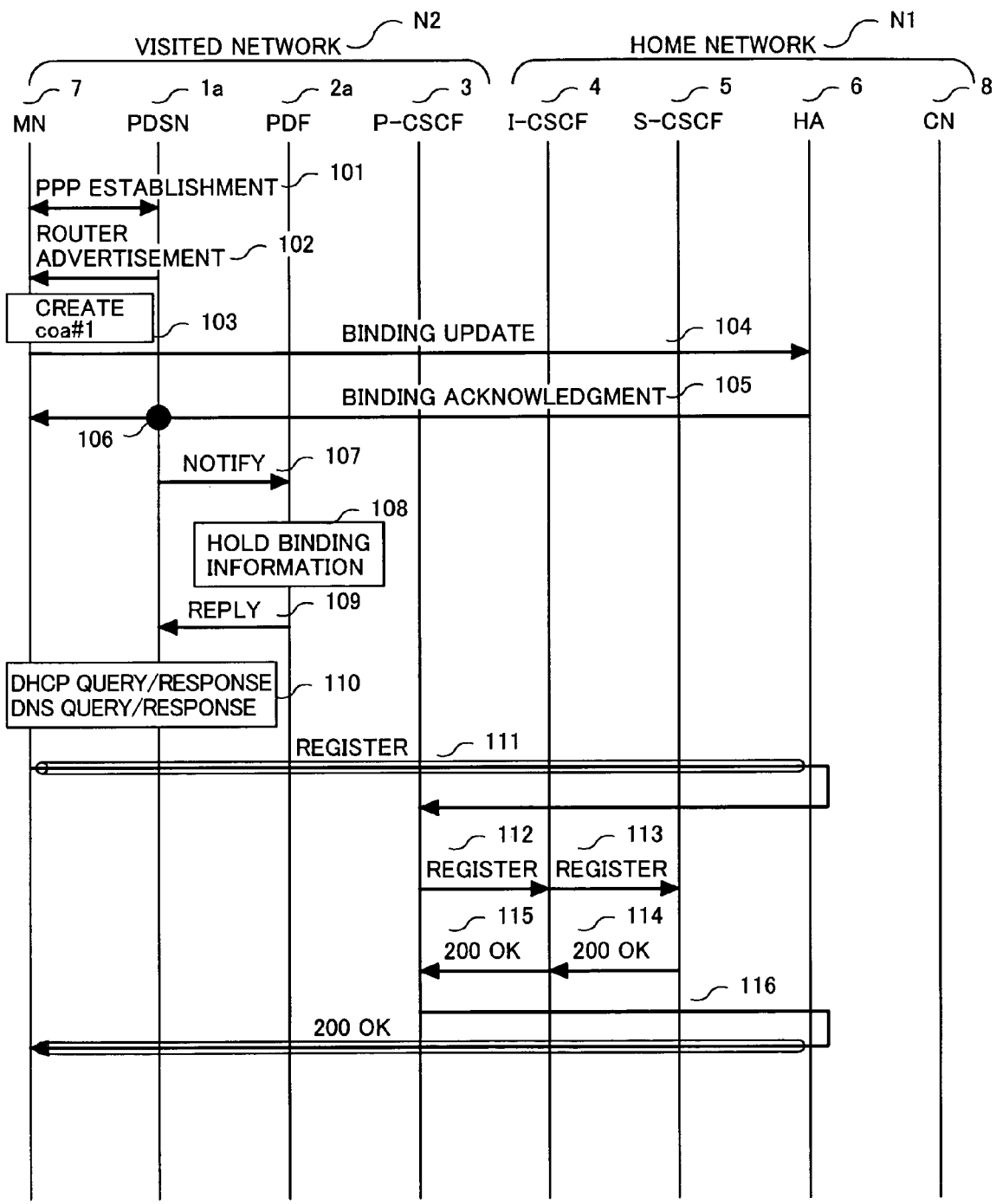
FIG. 5 is a diagram of a registration sequence in a first embodiment.
Figure 6:
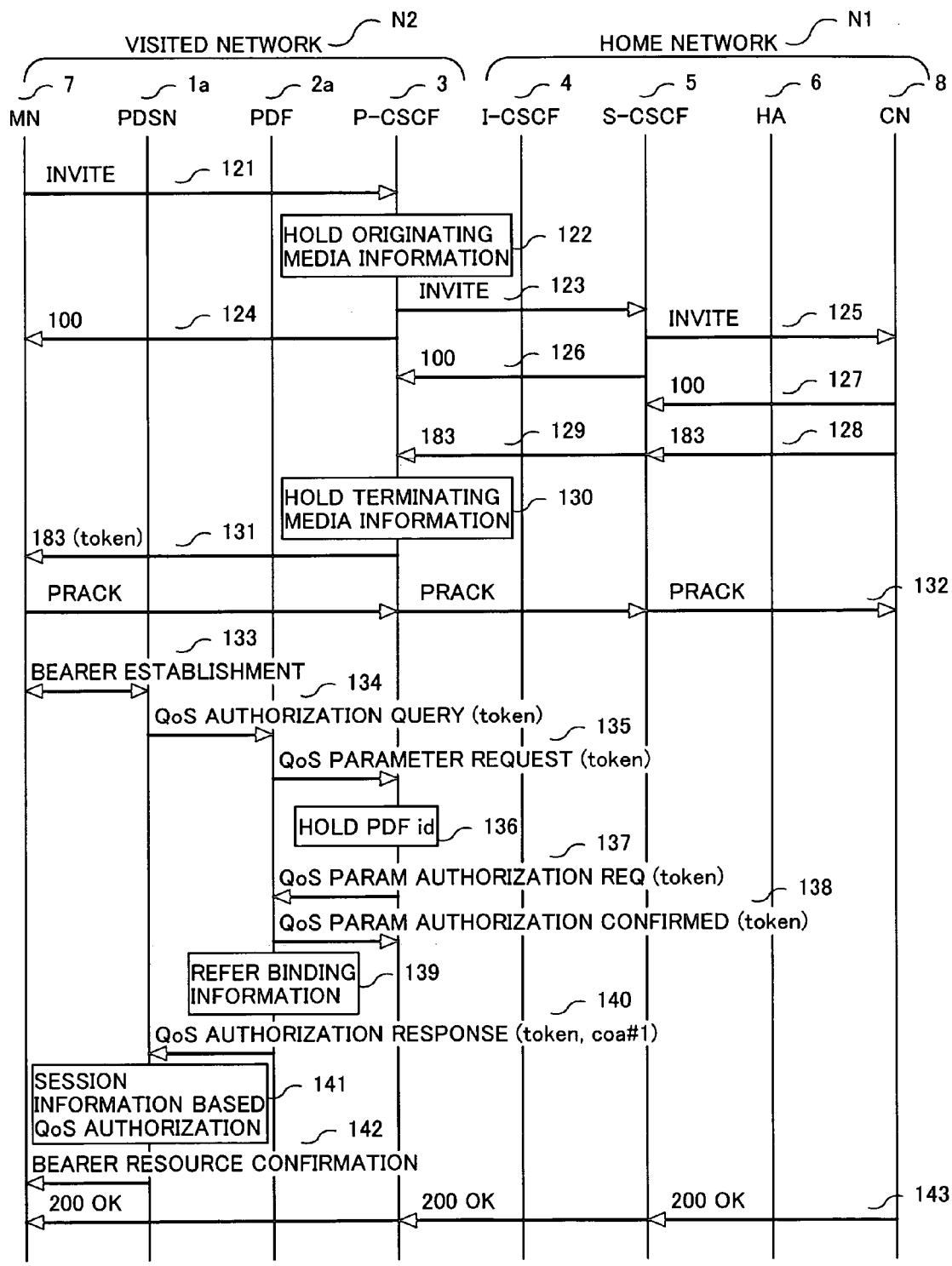
FIG. 6 is a transmission sequence diagram 1 in the first embodiment.
Figure 7:
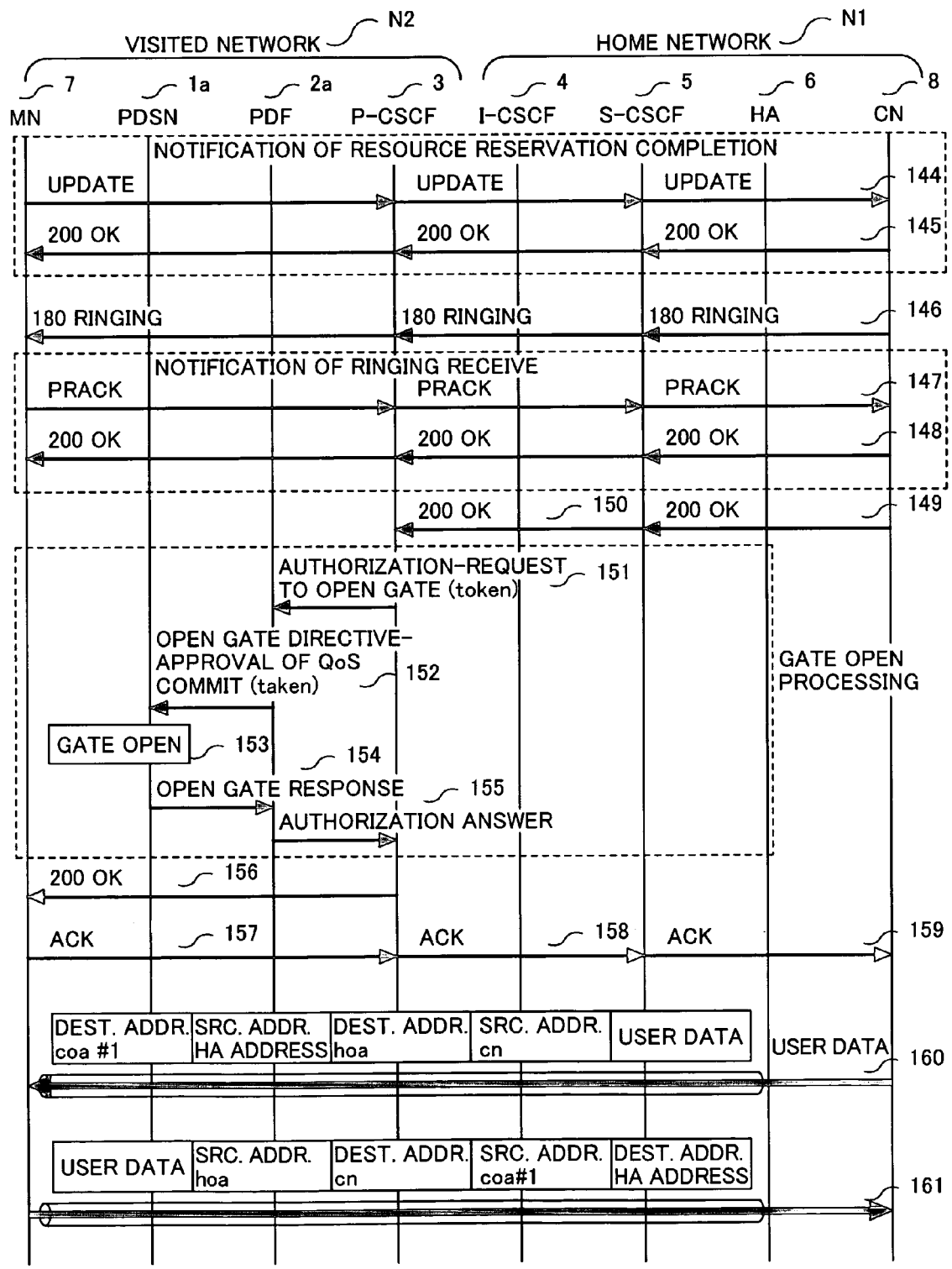
FIG. 7 is a transmission sequence diagram 2 in the first embodiment.

A sequence in which the MN 7 existing as a visitor in a RAN 9a shown in FIG. 1 performs registration to the HA 6 and establishes a session between itself and the a Correspondent Node (CN 8) according to a sequence shown in FIG. 5, FIG. 6, and FIG. 7 will be explained. First, a procedure in which the MN 7 performs registration will be explained using FIG. 5. In the first embodiment, the PDSN 1 is equipped with the Mobile-IP Binding information acquisition routine 50 and the QoS control routine 60. The PDF 2 is equipped with a QoS control routine 90. It is assumed that the address of the PDF 2 has been set in the PDSN 1.

The MN 7 existing in the radio access network (RAN) 9a of the visited network N2 establishes PPP between itself and the PDSN 1a (Step 101). The MN 7 receives the Router Advertisement from the PDSN 1a (Step 102) and acquires the CoA (Step 103). The MN 7 that acquired the CoA (coa#1) from the PDSN 1a transmits a registration message (Binding Update) to the HA 6 (Step 104). The Binding Update stores the following value. A source address of the IPv6 packet header is set to the CoA (coa#1) of the MN 7. The home address (hoa) of the MN 7 is set in an IPv6 Destination Options Header. The HA 6 receives the Binding Update and performs registration processing of the MN 7. After the end of the registration, the HA 6 transmits a response of the Binding Update (Binding Acknowledgement) to the MN 7 (Step 105). The Binding Acknowledgement stores the following value. A destination address of the IPv6 packet header is set to the CoA (coa#1) of the MN 7. The home address (hoa) of the MN 7 is set in the IPv6 Routing Header. The HA 2 operates as a proxy of the MN 7.

Figure 9:
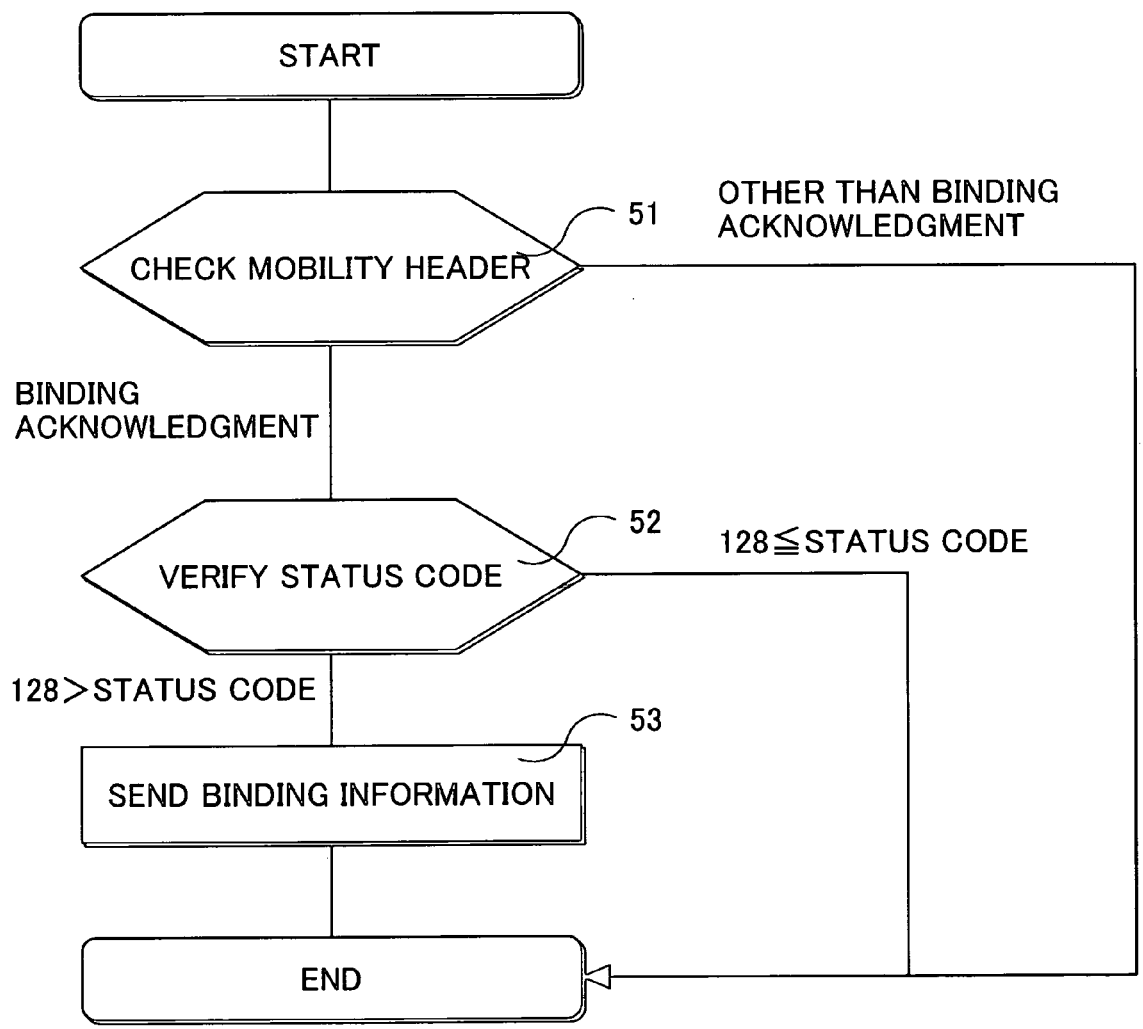
FIG. 9 is a diagram of a Mobile-IP Binding information acquisition routine that a QoS control function 18 of the PDSN 1 has.

When the PDSN 1a detects a packet containing the Mobility Header in the IPv6 extension header (Step 106), the PDSN la starts the Mobile-IP Binding information acquisition routine 50. FIG. 9 shows steps of the Mobile-IP Binding information acquisition routine 50. First, a type of the Mobility Header is checked. When the type of the Mobility Header is the Binding Acknowledgement (Step 51), a Status Code of the Mobility Header is checked (Step 52). When the Status Code is less than 128, the PDSN 1a transmits the Binding information of the MN 7 to the PDF 2a (53, 107) and terminates this routine. The Binding information of the MN 7 contains at least correspondence information between a home address of the MN 7 and a Care of Address of the MN 7. The Binding information of the MN 7 may contain a term of validity. The home address of the MN 7 is set in the Routing Header of a packet containing the Binding Acknowledgement. The Care of Address of the MN 7 is set in destination address of the packet containing the Binding Acknowledgment. The PDSN 1 can transmit the Binding information of the MN 7 to the PDF 2 by Step 106 and Step 107. By this, the PDF 2 is enabled to refer to the Binding information of the MN 7 when the PDF 2 generates QoS parameters that will be transmitted to the PDSN 1. When the received packet is other than the Binding Acknowledgment in Step 51 or when the Status Code of the Binding Acknowledgment is 128 or more in Step 52, this routine is terminated.

Returning to FIG. 5, when the PDF 2a receives the Binding information, the PDF 2a will search the MN information management table 210 by using the home address 211 of the MN 7 as a search key. When the entry of the MN 7 exists in an MN information management table 210, the PDF 2a updates the Binding information of the above-mentioned entry. When no entry of the MN 7 exists in the MN information management table 210, the PDF 2a generates a new entry 210-1 and stores the Binding information of the MN 7 (Step 108). Concretely, correspondence information between a home address (hoa) of the MN 7 and a Care of Address (coa#1) of the MN 7 is held. When storing of the Binding information is ended, the PDF 2a will transmit a response message to the PDSN 1a (Step 109). By the above steps, the PDF 2a was able to acquire the Binding information of the MN 7. This enables the PDF 2 to refer to the Binding information of the MN 7 when generating QoS parameters that will be transmitted to the PDSN 1.

When the MN 7 receives the Binding Acknowledgement (Step 105) indicating normal termination, the MN 7 will start SIP registration for the S-CSCF 5. First, an address of the P-CSCF 3 existing in the visited network N2 is acquired using a DHCP (Dynamic Host Configuration Protocol) or DNS (Domain Name System) (Step 110). The MN 7 transmits via the HA 2 an SIP registration request message (REGISTER) (Step 111) to the P-CSCF 3 whose address was acquired in Step 110. The original IP packet containing the REGISTER message 111 is transmitted to the HA 6 in the form of being encapsulated with the IPv6 that has the destination address to the HA 6. The HA 6 deletes the encapsulation IPv6 header from the received packet (de-encapsulation), and forwards the original IP packet to the P-CSCF 3.

The P-CSCF 3 specifies the I-CSCF 4 from the SIP URI of the MN 7 contained in a Start-line of the SIP registration message (REGISTER). The P-CSCF 3 transmits the SIP registration message (REGISTER) to the I-CSCF 4 (Step 112). The I-CSCF 4 specifies the S-CSCF 5 by referring to subscriber information that the home network N1 holds. The I-CSCF 4 transmits the SIP registration message (REGISTER) to the S-CSCF 5 (Step 113).

When the S-CSCF 5 receives the SIP registration message (REGISTER), the S-CSCF 5 will perform registration of the SIP. Concretely, the S-CSCF 5 holds correspondence information between the SIP URI of the MN (example: sip: mn@example.com) and the home address (hoa). When the SIP registration was ended, the S-CSCF 5 will transmit to the I-CSCF 4 a response message ("200 OK" ) to the SIP registration request (Step 114). The response message contains a message-header in which the address of the S-CSCF was set up. The I-CSCF 4 transmits the response message ("200 OK") to the P-CSCF 3 (Step 115). A program for SIP message processing 37 of the P-CSCF 3 acquires the address of the S-CSCF 5 from the response message, and holds correspondence information between SIP-URI and the S-CSCF 5 of the MN 7 and a home address of the MN 7. The P-CSCF 3 transmits a response message ("200 OK") to the MN 7 (Step 116). When the SIP registration request message passed through the HA 6 (Step 111), the response message is forwarded to the MN 7 via the HA 6. In this case, the IP packet containing the response message that is transmitted by the P-CSCF 3 is encapsulated by the HA 6 with an IP header whose destination address is the CoA (coa#1) of the MN 7, and forwarded to the MN 7. The registration to the HA 6 and the registration to the S-CSCF 5 described above are executed at a fixed period even when the Care of Address of the MN 7 is not changed in order to update both the term of validity of the entry of the Binding information that the HA 6 manages and the term of validity of the entry of the SIP registration information that the S-CSCF 5 manages. A cycle of registration to the HA 6 and a cycle of registration to the S-CSCF 5 are not necessarily in agreement with each other.

Next, a procedure in which the MN 7 transmits to the Correspondent Node (CN) according to a sequence shown in FIG. 6 to FIG. 7 will be explained. The MN 7 transmits a session establishment request message (INVITE) that contains information indicating that media information of the MN 7 and QoS control are needed in the message-body part to the P-CSCF 3 (Step 121). In the first embodiment, a packet that the MN 7 transmits and receives to and from the P-CSCF 3 goes through the HA 6. The IP packet that the MN 7 transmits is encapsulated with the IPv6 header having a destination address to the HA 6. A packet that the MN 7 receives is encapsulated with the IPv6 header having a destination address that is destined to the Care of Address of the MN 7 in the HA 6. When receiving the session establishment request message (INVITE), the P-CSCF 3 will store media information of the MN 7 in the session information management table 800 (Step 122).

First, the session information management table 800 is searched by using tags of a Call-Id header and a From header in a message-header of the received message (Step 121) as search keys. When the corresponding entry does not exist in the session information management table 800, the P-CSCF 3 adds a new entry 800-1 to the session information management table 800, and stores information of the message-body part of the received message (Step 121) in the corresponding entry. Concretely, the IP address (hoa) contained in the c-line is stored in O-c 804, and a receiving port number and a media type (4004, audio) contained in an m-line are stored in O-m 805. When there are a-line and b-line, attribute information contained in the a-line and bandwidth information contained in the b-line are stored in O-a 806 and in O-b 807, respectively. In this embodiment, an IP address that the MN 7 sets in the c-line is the home address (hoa) of the MN 7.

The P-CSCF 3 transmits a session establishment message (INVITE) (Step 123) to the S-CSCF 5 that acquired the address in Step 115, and transmits a provisional response 100 (Trying) to the MN 7 (Step 124). The S-CSCF 5 transmits a session establishment request message (INVITE) (Step 125) to the CN 8, and transmits the provisional response 100 (Trying) to the P-CSCF 3 (Step 126). The CN 8 transmits to the S-CSCF 5 the provisional response 100 (Trying) (Step 127) and a provisional response 183 (Session Progress) containing media information in its message-body part (Step 128). The S-CSCF 5 forwards the provisional response 183 to the P-CSCF 3 (Step 129). When the P-CSCF 3 receives the provisional response 183 containing the media information, the P-CSCF 3 will store the media information of the CN 8 in the session information management table 800 (Step 130).

First, the session information management table 800 is searched by using tags of the Call-Id header and the From header in the message-header of the received message (Step 129) as search keys. Here, the P-CSCF 3 detects the entry 800-1 generated in Step 122, and stores media information contained in the message-body part of the received message in the corresponding entry (Step 129). Concretely, a Tag contained in "To header" is stored in a field of "to tag" 802, an IP address (cn) contained in the c-line is stored in a field of "T-c" 808, and a receiving port number and a media type (6002, audio) contained in the m-line are stored in a field of "T-m" 809, respectively. When the a-line and the b-line exist, attribute information contained in the a-line and attribute information contained in the b-line are stored in T-a 810 and T-b 811, respectively.

Next, the P-CSCF 3 generates an identifier "Token" used for QoS control, and adds the Token (111@pcscf) to the corresponding entry 800-1 of the session information management table 800. The Token contains information indicating an identifier of the P-CSCF 3, information indicating whether the P-CSCF 3 is a caller or callee, and information whereby media streams that the MN 7 and the CN 8 transmit and receive are uniquely identified. The P-CSCF 3 transmits a provisional response 183 containing the Token (111@pcscf) to the MN 7 (Step 131).

Figure 12:
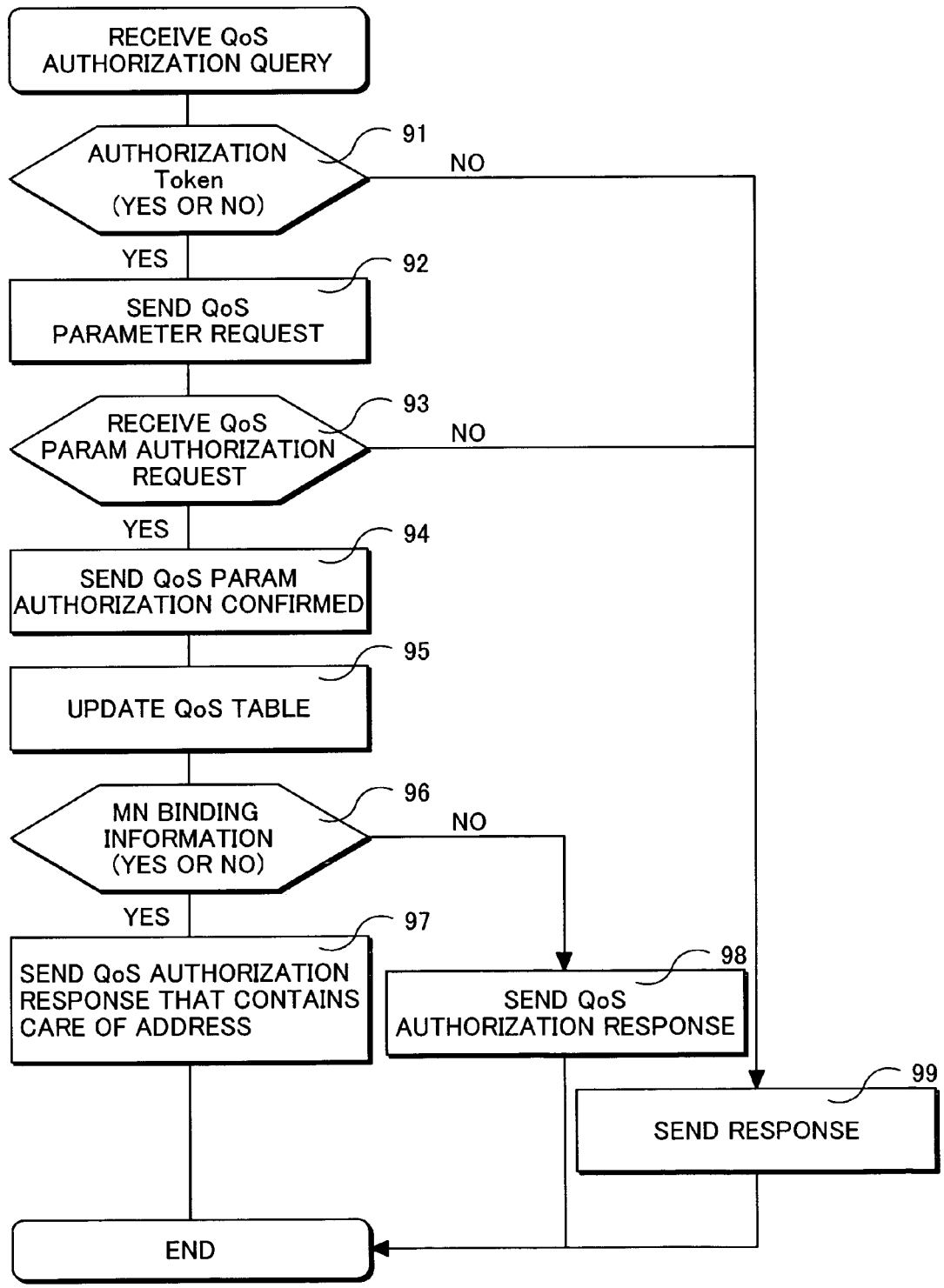
FIG. 12 is a diagram of a QoS control routine that a QoS control function 27 of the PDF 2 has.

The MN 7 transmits PRACK (Provisional Response Acknowledgment) in order to notify the CN 8 of reception of the provisional response 183 (Step 132). The CN 8 forwards a response ("200 OK") indicating that the CN 8 received the PRACK normally to the MN 7 (Step 143). The MN 7 establishes bearer of a radio access network that is used for media transmission ands reception between itself and the PDSN 1*a* (Step 133) in parallel to transmission of the PRACK (Step 132). Here, the MN 7 notifies the PDSN 1*a* of the Token received in Step 131. When the message received in Step 133 contains a Token, the PDSN 1*a* determines that QoS control according to the application is necessary. Then, the PDSN 1*a* transmits a QoS Authorization Query containing the Token to the PDF 2*a* (Step 134). When the QoS control function 27 of the PDF 2*a* receives the QoS Authorization Query, the QoS control function 27 will start a QoS control routine 90 shown in FIG. 12. First, the QOS control function 27 verifies whether the received message contains a Token (Step 91). When the received message does not contain the Token, the PDF 2 transmits an error notification to the PDSN 1 (Step 99), and terminates this routine. When the received message contains the Token, the PDF 2 transmits a QoS Parameter Request containing the Token (111@pcscf) in order to acquire QoS parameters from the P-CSCF 3 (Steps 92, 135). PDF extracts an address (pcscf) of the P-CSCF 3 from the received Token (111@pcscf) in Step 91.

Returning to FIG. 6, when the P-CSCF 3 receives QoS Parameter Request (Step 135) containing the Token (111@pcscf), the P-CSCF 3 will search the session information management table 800 by using the QoS Parameter Request (Step 135) containing the Token (111@pcscf) as a search keys. When the corresponding entry 800-1 exists, the P-CSCF 3 stores the PDF address (pdf1) that sends QoS Parameter Request to the P-CSCF 3 in the PDF id 813 of the corresponding entry of the session information management table 800 (Step 136). Moreover, the P-CSCF 3 reads caller media information 804-807 and callee media information 808-811 from the corresponding entry in the session information management table 800. The P-CSCF 3 transmits a QoS Param Authorization Request contains the caller and callee media information and the Token to the PDF 2*a* (Step 137).

Returning to FIG. 12, when the PDF 2*a* receives the QoS Param Authorization Request containing the caller and callee media information and the Token (Steps 137, 93), the PDF 2*a* will transmit the response confirmation (QoS Param Authorization Confirmed) to the P-CSCF 3 (Steps 138, 94).

Next, the PDF 2a searches the QoS information management table 830 by using the Token (111@pcscf) as a search key (Step 95). When the corresponding entry does not exist, the PDF 2 adds a new entry 830-1 to the QoS information management table 830 (Step 95). Concretely, the PDF 2 stores a caller IP address (hoa) received in Step 137 in a field 832, a port number and a media type (4004 audio) in a field 833, a callee IP address (cn) in 837, and a port number and a media classification (6002 audio) in a field 838, respectively. Next, the PDF 2 searches for the MN's home address in the MN information management table 210 by using a caller IP address (hoa) contained in a message received in Step 137 (Step 96) as a search key. When an entry of the IP address corresponding to the MN information management table 210 exists, the CoA will be read from the corresponding entry and a CoA existence flag 836 in the QoS information management table 830 will be set to "existence." Similarly, the PDF 2 searches for the MN's home address of the MN information management table 210 by using a callee IP address (cn) contained in a message received in Step 137 as a search key. When an entry of the IP address corresponding to the MN information management table 210 does not exist, the CoA existence flag 841 of the QoS information management table 830 will be set to "nonexistence" (Step 96).

The PDF 2 is generating the corresponding entry 210-1 in Step 108. For this reason, the PDF 2 reads coa#1 from the corresponding entry 210-1, and sets the CoA existence flag 836 to "existence." Then, the PDF 2 acquires QoS class (high) from the QoS class table 850 by using media type (audio) of the caller/callee contained in a message received in Step 137 as a search key. The PDF 2 sets acquired QoS class in a QoS Class field 842 of the corresponding entry of the QoS information management table 830.

In Step 139, the PDF 2 refers to the MN information management table 210, whereby it becomes possible for the PDF 2 to set QoS parameters that will be transmitted to the PDSN 1 to the Care of Address of the MN 7. The PDF 2 transmits a QoS authorization response that contains the Token, the Care of Address (coa#1) of the MN 7 read from the entry 210-1 as QoS information, and the QoS class (high) (Steps 140, 97), and terminates this routine. The PDF 2 transmits the QoS parameter to the PDSN 1 using the QoS authorization response. The authorization response may contain a caller port number, the callee IP address, and the callee port number.

Figure 10:
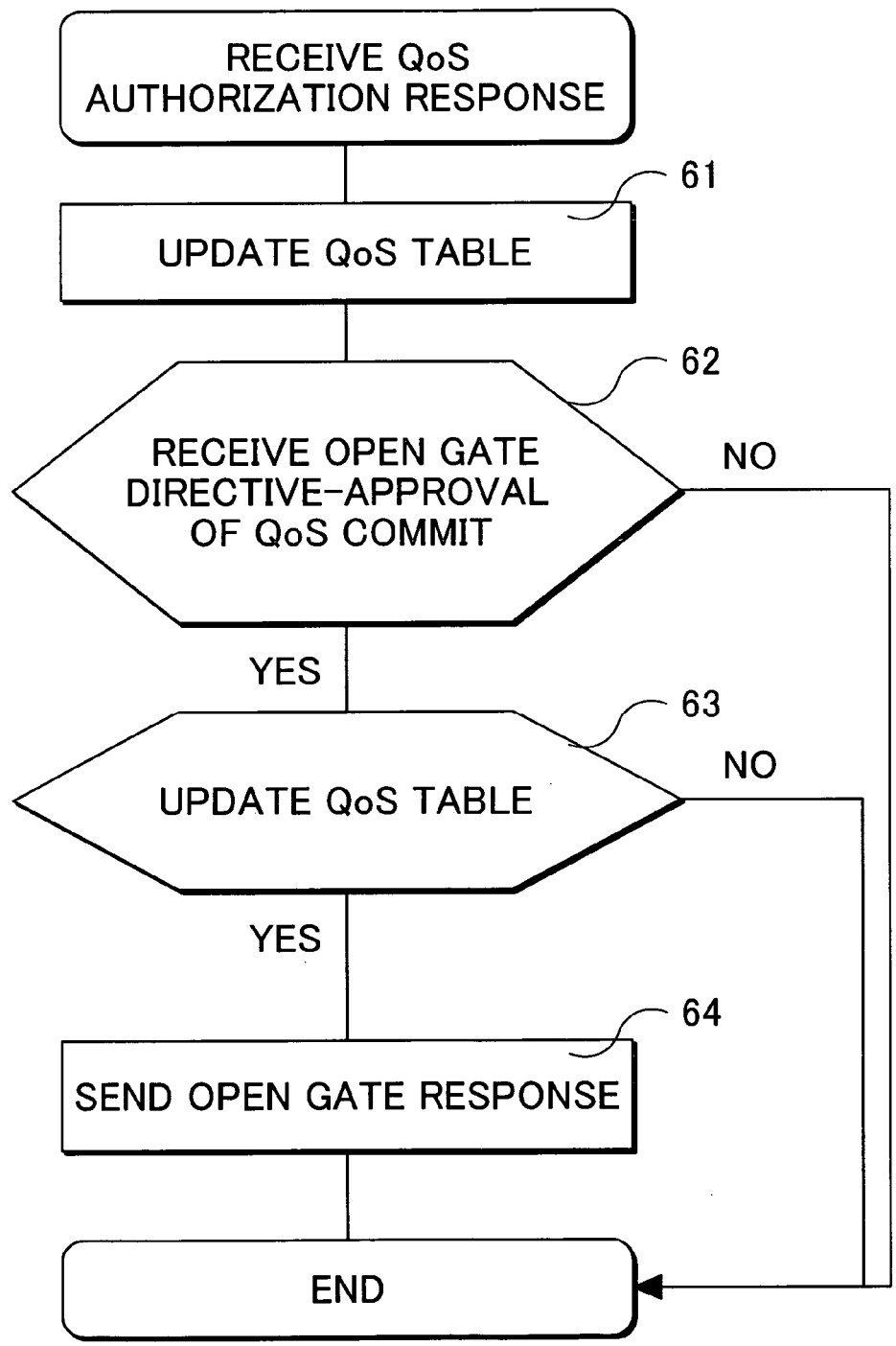
FIG. 10 is a diagram of a QoS control routine that the QoS control function 18 of the PDSN 1 has.

The PDF 2 sets a parameter of Step 140 to the Care of Address (coa#1) of the MN 7, and consequently the PDSN 1 can use the Care of Address (coa#1) as QoS parameters. In Step 96, when an entry of the IP address corresponding to the MN information management table 210 does not exist, the PDF 2 transmits the QoS authorization response that does not contain the Care of Address of the MN to the PDSN 1, and terminates this routine (Step 98). Returning to FIG. 6, when the PDSN 1a receives the QoS authorization response (Step 140) from the PDF 2a, the PDSN 1 will start the QoS control routine 60 of the QoS control function 18. FIG. 10 shows each step of the QoS control routine 60. The PDSN 1 searches the QoS information management table 220 by using a Token (111@pcscf) contained in a received message in Step 140 as a search key (Step 61). When the corresponding entry does not exist, the PDSN 1 adds a new entry to the QoS information management table 220 (Steps 61, 141).

Concretely, first, the PDSN 1 determines whether P-CSCF is a caller P-CSCF, or a callee P-CSCF from a Token (111@pcscf) received in Step 140. When P-CSCF is the caller P-CSCF, the PDSN 1 stores caller media information received in Step 140 (IP address (coa#1) and a port number (4004)) in the source IP address 222 and the source port 223 in the QoS management information table 220, respectively, and stores the callee media information (IP address (cn) and port number (6002)) in Dest. IP address 226 and Dest. Port 227 in the QoS management information table 220 and the QoS class (high) in a field 224, respectively.

The PDSN 1 stored the Care of Address (coa#1) of the MN 7 as the caller media information in the QoS management information table 220. By this, it becomes possible for the PDSN 1 to use the Care of Address of the MN 7 as a condition whereby priority is determined, in the case, for example, where the PDSN 1 performs priority control of a packet by referring to the QoS management information table 220. When the P-CSCF 3 is the callee P-CSCF, the PDSN 1 stores the callee media information received in Step 140 (IP address, a port number, etc.) in the Source IP address 222 and the Source Port 223 in the QoS management information table 220, respectively, and stores the caller media information (IP address, a port number, etc.) in Dest. IP address 226 and Dest. Port 227 in the QoS management information table 220 and the QoS class (high) in the field 224, respectively. The PDSN 1a transmits bearer resource confirmation to the MN 7 (Step 142), and waits for reception of an open gate directive message (62).

Next, a sequence in FIG. 7 will be explained. The MN 7 transmits an UPDATE message to the CN 8 in order to notify end of resource reservation (Step 144). When the CN 8 receives a UPDATE message (Step 144), the CN 8 will transmit a response message indicating that the UPDATE was received normally ("200 OK") to the MN 7 via the S-CSCF 5 and the P-CSCF 3 (Step 145). Next, the CN 8 starts a call for a user and transmits a provisional response message (180 Ringing) indicating that calling is being done to the MN 7 via the S-CSCF 5 and the P-CSCF 3 (Step 146). The MN 7 transmits a PRACK (Provisional Response Acknowledgment) (Step 147) in order to notify reception of the provisional response (Step 180) to the CN 8. The CN 8 transmits a response message ("200 OK") indicating that the PRACK was normally received to the MN 7 (Step 148).

When the user responded to it, the CN 8 will transmit a response message ("200 OK") to an INVITE received in Step 125 to the P-CSCF 3 via the S-CSCF 5 (Steps 149, 150). When the P-CSCF 3 receives the response message ("200 OK") is received (Step 150), The P-CSCF 3 will search the session information management table 800 by using at least one of a Call ID, a Tag of a From header, and a Tag of a To header all of that are contained in the response message as a search key. The P-CSCF 3 detects an entry that is newly generated in Step 122 and updated in Step 130 and Step 136, and reads id (pdf1) and a Token (111@pcscf) of the PDF 2 from the corresponding entry.

The P-CSCF 3 transmits an Authorization Request to Gate Open containing the Token in the PDF 2a (Step 151). The PDF 2a searches the QoS information management table 830 by using the Token as a search key. The PDF 2a detects the entry generated at the time of reception in Step 137. When the corresponding entry exists in the table, the PDF 2a will transmit an Open Gate Directive Approval of QoS Commit message containing the Token to the PDSN 1a (Step 152).

Returning to FIG. 10, when the PDSN 1a received the message (Step 62), the PDSN 1a will search the QoS information management table 220 (Step 63) by using the Token as a search key. The PDSN 1a detects the entry generated in Step 141. When the corresponding entry exists in the table, the PDSN 1 will update the packet transmission/reception flag on/off 225, transmit an Open Gate Response to the PDF 2, and terminate this routine (Steps 64, 153, 154). When, in Step 62, the PDSN 1a did not receive an Open Gate Directive-Approval of QoS Commit message in a fixed period of time, or when the corresponding entry does not exist in Step 63, the PDSN 1 will terminate this routine.

Returning to FIG. 7, when the PDF 2a receives Open Gate Response 154, the PDF 2a will transmit an Authorization Answer message (Step 155) to the P-CSCF 3. After receiving the Authorization Answer message (Step 155), the P-CSCF 3 transmits to the MN 7 a normal response message ("200 OK") to the INVITE received in Step 121 (Step 156). When receiving the normal response message 156, the MN 7 will transmit an acknowledgment message (ACK) to the CN 8 via the P-CSCF 3 and the S-CSCF 5 (Steps 157-159). By the above processing, a session of performing the QoS control between the MN 7 and the CN 8 is established, so that transmission and reception of user data becomes possible (Steps 160, 161).

A packet that the MN 7 receives is encapsulated with the IPv6 header having a destination address to the Care of Address of the MN 7 in the HA 6 (Step 160). An IP packet that the MN 7 transmits is encapsulated with an IPv6 header in which the source address is set to the Care of Address of the MN 7 (Step 161). The PDSN refers to the QoS information management table 220 and forwards a packet according to the QoS class at the time of packet transmission. In Step 141, the PDSN 1 stores the Care of Address (coa#1) of the MN 7 in a field of the caller media information in the QoS management information table 220. Therefore, the PDSN 1 can specify the priority (high) corresponding to the Care of Address (coa#1) and forward a packet. That is, the PDSN 1 can provide the QoS control according to a Care of Address.

Following the above, a procedure in which the MN 7 that performed registration and establishment of a session in steps shown in FIG. 5 to FIG. 7 according to a sequence shown in FIG. 14 performs handoff between the PDSNs will be explained. The MN 7 establishes a PPP between itself and a PDSN 1b and acquires a new Care of Address (coa#2) (Steps 162-164). The MN 7 registers the new Care of Address (coa#2) in the HA 6 (Binding Update, Step 165). The HA 6 updates the Binding information of the MN 7 and transmits a response message (Binding Acknowledgment) of the Binding Update to the MN 7 (Step 166). Processing (167-170) in which the PDSN 1b detects Binding Acknowledgment and notifies the PDF 2b of the Binding information of the MN 7 is the same as that in Steps 106-109 of FIG. 5. By Steps 167-170, the PDSN 1b can notify the PDF 2b of the Binding information of the MN 7 (correspondence information between hoa and coa#2). Because the PDF 2b acquires the Care of Address (coa#2), the PDF 2b is enabled to set the QoS parameter that will be transmitted to the PDSN 1b to the Care of Address (coa#2)

The MN 7 refers to the SIP dialog state that the MN manages as part of SIP protocol processing. When the state of the SIP dialog is "confirmed," the MN 7 will executes Step 171 to Step 180. Processing of Step 171 to Step 180 is the same as processing of Step 133 to Step 142 of FIG. 6. In Step 179, the PDSN 1 stores the Care of Address (coa#2) of the MN 7 in a field of the caller media information in the QoS management information table 220. By this, the PDSN 1b is enabled to perform the QoS control of packet priority control etc. using the Care of Address of the MN 7. When the state of the SIP dialog is any state other than "confirmed" in Step 171, the MN 7 will perform processing of Step 121 of FIG. 6 to Step 159 of FIG. 7.

When the P-CSCF 3 receives the QoS Param Authorization Confirmed (Step 176), the P-CSCF 3 will search the session information management table 800 by using the Token contained in the message as a search key. When the corresponding entry exists, the P-CSCF 3 reads tags of Call ID and To header and a tag of From header from the corresponding entry. Next, the P-CSCF 3 refers to a SIP dialog state that the SIP message processing unit manages as part of the SIP protocol processing. When the state of SIP dialog is "confirmed," the P-CSCF 3 performs the same processing (Step 181) as that in Step 150 to Step 155 in FIG. 7. When the state of SIP dialog is any state other than "confirmed," the P-CSCF 3 executes Step 181 when receiving a final response ("200 OK") to the INVITE. The MN 7 is enabled to transmit and receive the user data using the Care of Address coa#2 (Steps 182, 183).

The above processing enables the PDSN 1b to use a Care of Address coa#2 of the MN 7 as conditions for packet priority control and packet filtering at the time of packet forwarding. That is, the PDSN is enabled to provide QoS control according to the Care of Address of the MN 7. Incidentally, in this embodiment, the P-CSCF 1 and the PDF 2 may be realized with the same communication equipment. Alternatively, in this embodiment, the PDF 2 and the P-CSCF 3 may be realized with the same communication equipment.

According to a first embodiment of this invention, the PDSN 1 comprises means for detecting the Binding information of the Mobile IP and means for notifying the PDF 2 of the acquired Binding information, and the PDF 2 comprises means for correlating the QoS parameter information and the Binding information of the Mobile IP and notifying the PDSN 1 of the QoS information, whereby the PDSN 1 is enabled to use the Care of Address of the MN 7 as QoS parameters. Because the PDSN 1 refers to the QoS information containing the Care of Address when performing packet filtering and packet priority control, the PDSN 1 is enabled to perform QoS control using a Care of Address.

Second Embodiment

A second embodiment of this invention will be described using the attached drawings. The second embodiment is characterized by that the P-CSCF 3 has means for acquiring the Binding information of the MN, and means of notifying the PDF 2 of the QoS parameters by referring to the Binding information. Because the P-CSCF 3 has the above-mentioned means, the P-CSCF 3 is enabled to notify the PDF 2 of the QoS parameters that contain the Care of Address when the P-CSCF 3 received a session establishment request from the MN 7.

In the second embodiment, the program for executing the QoS control function 18 of the PDSN 1 does not have the Mobile-IP Binding information acquisition routine 50. In the second embodiment, the program for executing the QoS control function 27 of the PDF 2 does not have the MN information management table 210. In the second embodiment, the QoS information management table 830 of the PDF 2 does not need to be equipped with the CoA existence flags 836, 841. In the second embodiment, when the QoS information management table 830 of the PDF 2 does not have the CoA existence flags 836, 841, the QoS control function 27 of the PDF 2 has the QoS control routine 80 instead of the QoS control routine 90.

Figure 17:
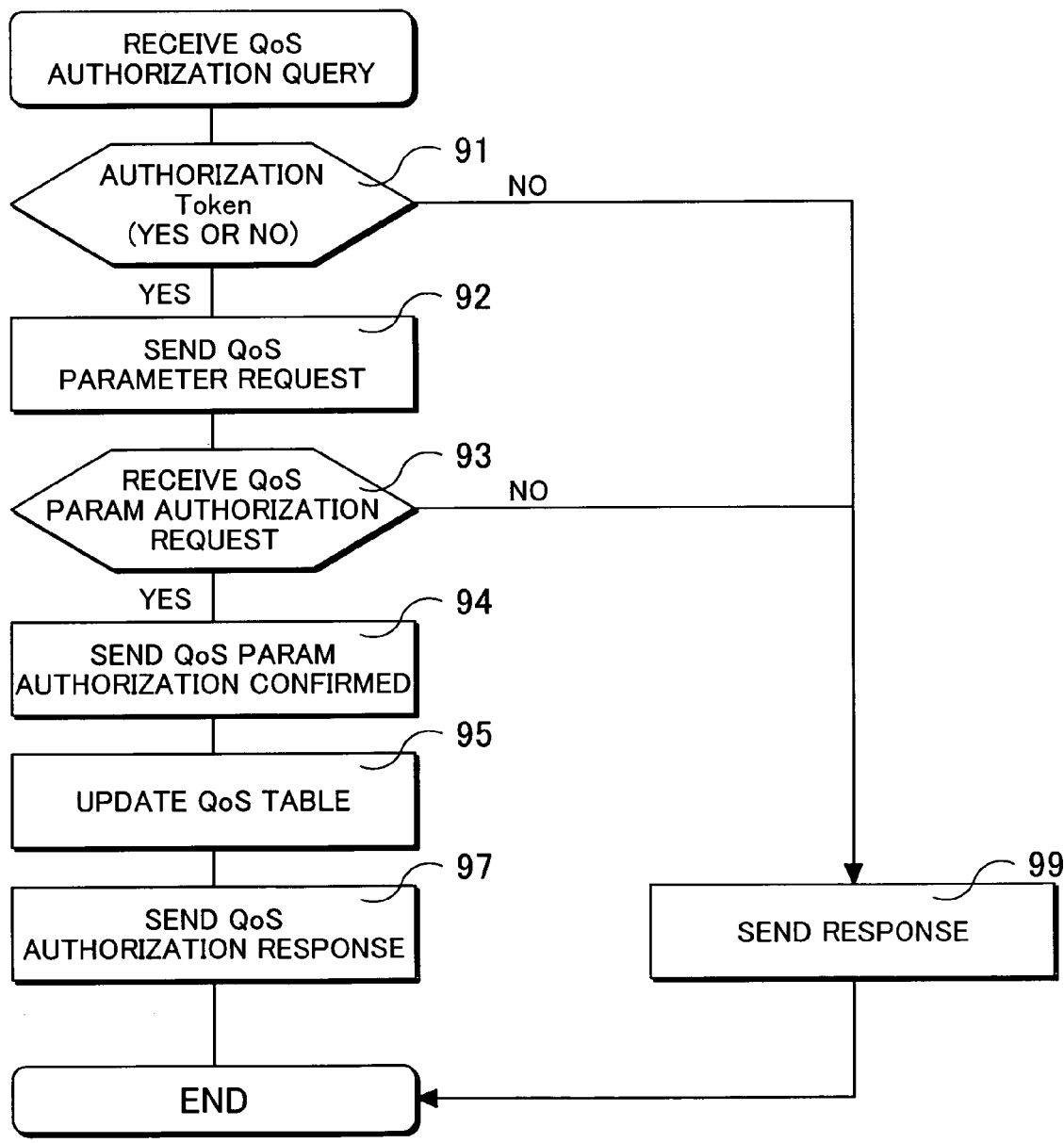
FIG. 17 is a diagram of a QoS control routine that the QoS control function 27 of the PDF has in the second embodiment.

FIG. 17 shows the QoS control routine 80. The QoS control routine 80 differs from the QoS control routine 90 in that the former does not contain a step of MN Binding information existence/nonexistence 96. FIG. 15 shows an example of a composition of the P-CSCF 3 in the second embodiment. In the second embodiment, the memory 35 of the P-CSCF 3 is further equipped with a program for executing Binding information control 39. The program for Binding information control 39 is equipped with the MN information acquisition routine 70 and the MN information management table 820. The QoS control function 38 of the P-CSCF 3 in the second embodiment is equipped with a session information management table 870.

Figure 16:
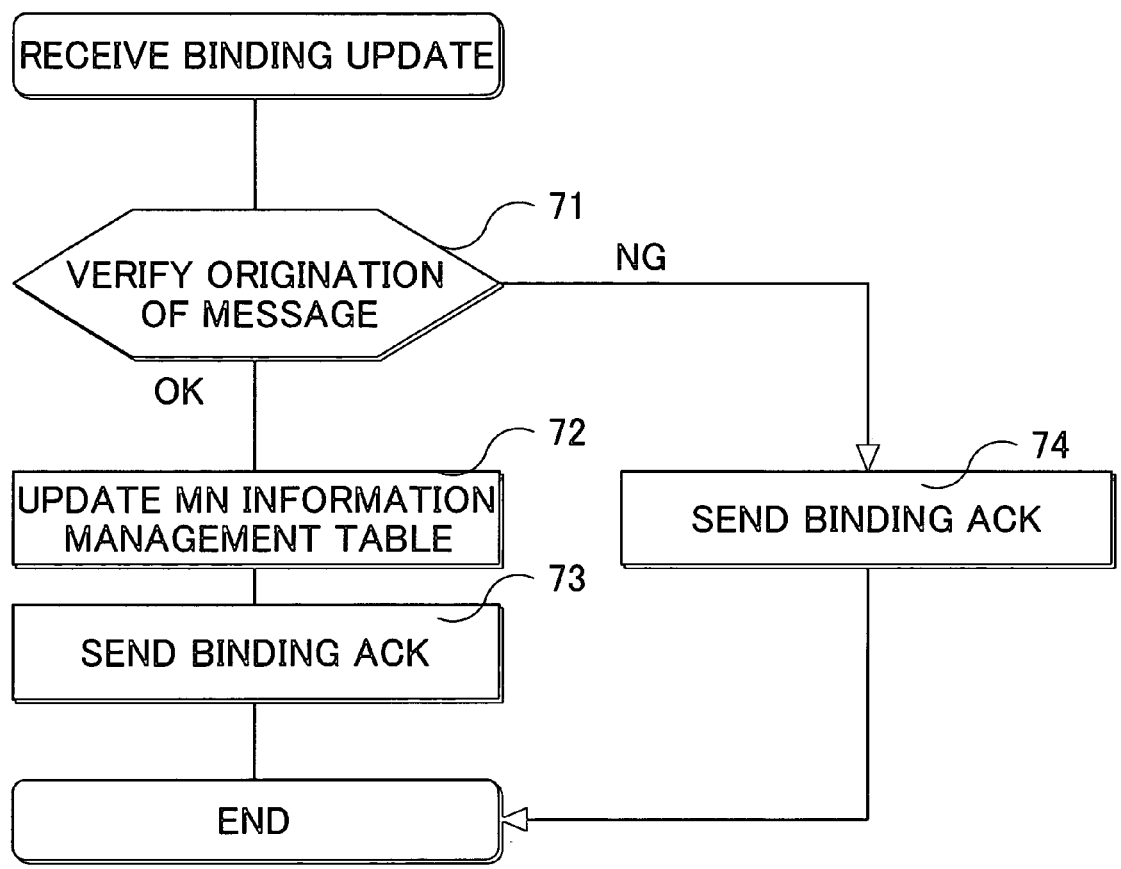
FIG. 16 is a diagram of an MN information acquisition routine that a Binding information management 39 of the P-CSCF 3 has in the second embodiment.

FIG. 16 shows the MN information processing routine 70. Because the P-CSCF is equipped with the MN information acquisition routine 70 and the session information management table 870, whereby it becomes possible for the P-CSCF to acquire and hold the Binding information of the MN 7 (correspondence information between a home address and a Care of Address). The P-CSCF holds the Binding information on the MN, whereby it becomes possible for the P-CSCF to transmit the QoS parameters containing the Care of Address of the MN to the PDF when P-CSCF receives an inquiry of the QoS parameters from the PDF.

FIG. 13B is an example of a table composition of the MN information management table 820. The MN information management table 820 stores at least a correspondence relationship between the home address 821 of the MN and the Care of Address 822. The MN information management table 820 may contain the expiration 823. When the MN information management table 820 contains the expiration 823, the P-CSCF 3 can specify the term of validity of the above-mentioned entry. FIG. 13C is an example of a table composition of the session information management table 870 in the second embodiment. The session information management table 800 stores at least a correspondence relationship of the flags 871, 872 indicating the existence of the Care of Address in addition to the entry of the session information management table 800.

Figure 18:
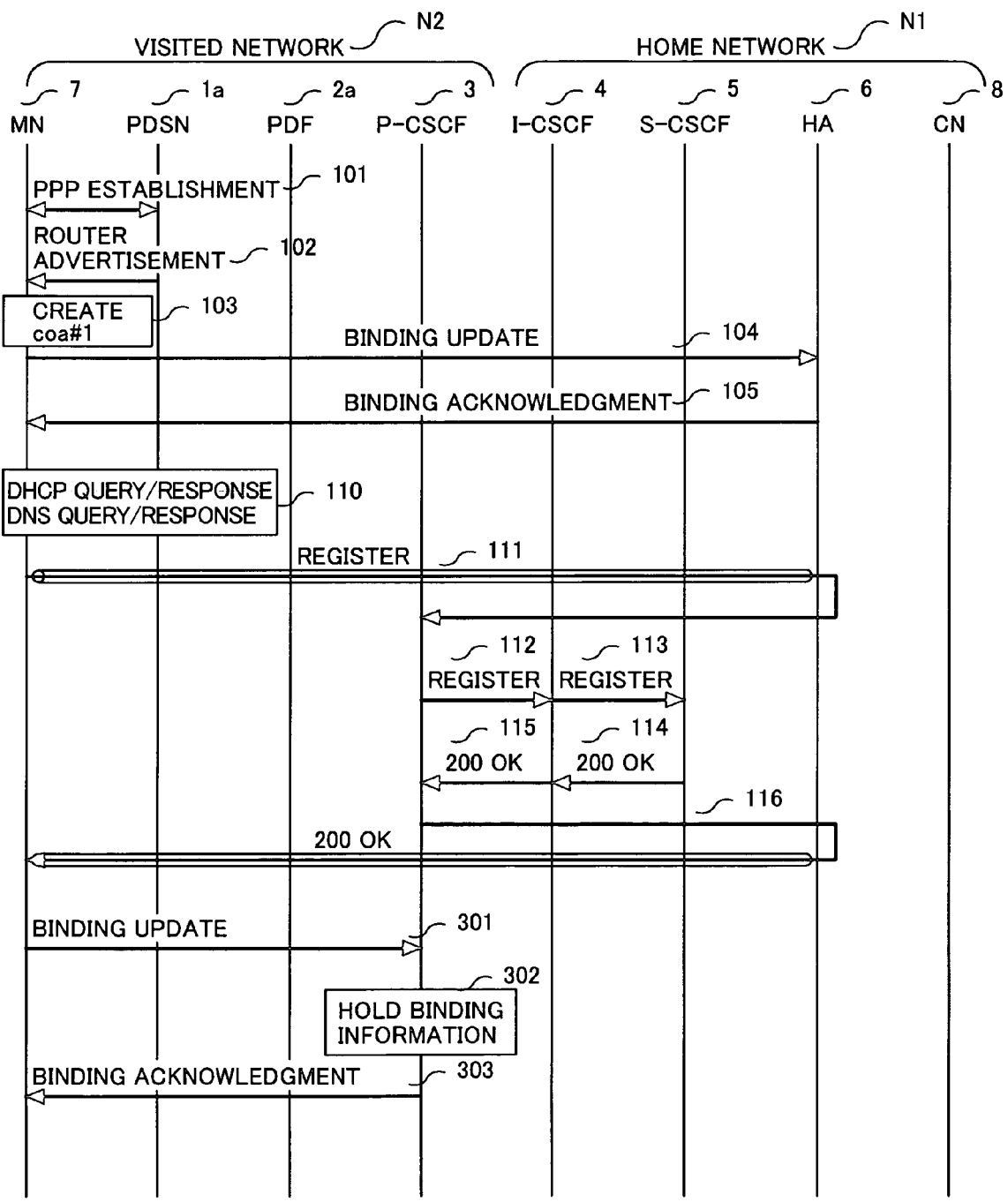
FIG. 18 is a diagram of a registration sequence in the second embodiment.

Because the session information management table 870 is equipped with the flags 871, 872 indicating existence of the Care of Address, the P-CSCF is enabled to manage the existence/nonexistence of the Care of Address. Moreover, when the Care of Address exists, it becomes possible for the P-CSCF to read the Care of Address stored in the MN information management table 820 and generate QoS parameters containing the Care of Address. According to a sequence shown in FIG. 18, a procedure in which the MN 7 in the second embodiment registers location information will be explained.

A procedure (from Step 101 to Step 105) in which the MN 7 acquires the CoA (coa#1) in the visited network and performs registration to the HA 6 is the same as the first embodiment. A procedure (from Step 110 to Step 116) in which the MN 7 acquires the address of the P-CSCF in the visited network and performs SIP registration to the S-CSCF is the same as the first embodiment. In the second embodiment, when the MN 7 receives an encapsulated SIP normal response message ("200 OK") (Step 116), the MN 7 will notify the Binding information of the MN 7 (correspondence information between a home address and a Care of Address) to the P-CSCF 3 that is a source of the above-mentioned message. When the program for the Binding information management 39 of the P-CSCF 3 receives the Binding Update (Step 301) containing the Binding information from the MN 7, the Binding information management 39 will start the MN information gathering routine 70.

The P-CSCF 3 verifies received a source of the message received in Step 301 (Step 71). The P-CSCF 3 searches for information that the SIP message processing 37 acquired in Step 115 by using as a search key the home address of the MN 7 contained in the extension header of an IP packet received in Step 301. When the corresponding entry exists in the P-CSCF 3, the P-CSCF 3 refers to the MN information management table 820 by using the home address of the MN 7 as a search key. When the corresponding entry does not exist, the P-CSCF 3 generates a new entry and stores a correspondence relationship between the home address of the MN 7 and the Care of Address thereof in the MN information management table 820 (Step 72). The P-CSCF 3 transmits the Binding Acknowledgment indicating the end of registration to the MN 7 (Steps 73, 303) and terminates this routine.

By the above steps, the P-CSCF acquires the Binding information (correspondence information between a home address and a Care of Address) from the MN. This enables the P-CSCF to set QoS parameters that will be transmitted to the PDF to the Care of Address of the MN. In Step 71, when the corresponding entry does not exist, the P-CSCF transmits Binding Acknowledgment containing an error notice (Step 74) and terminates this routine.

Figure 19:
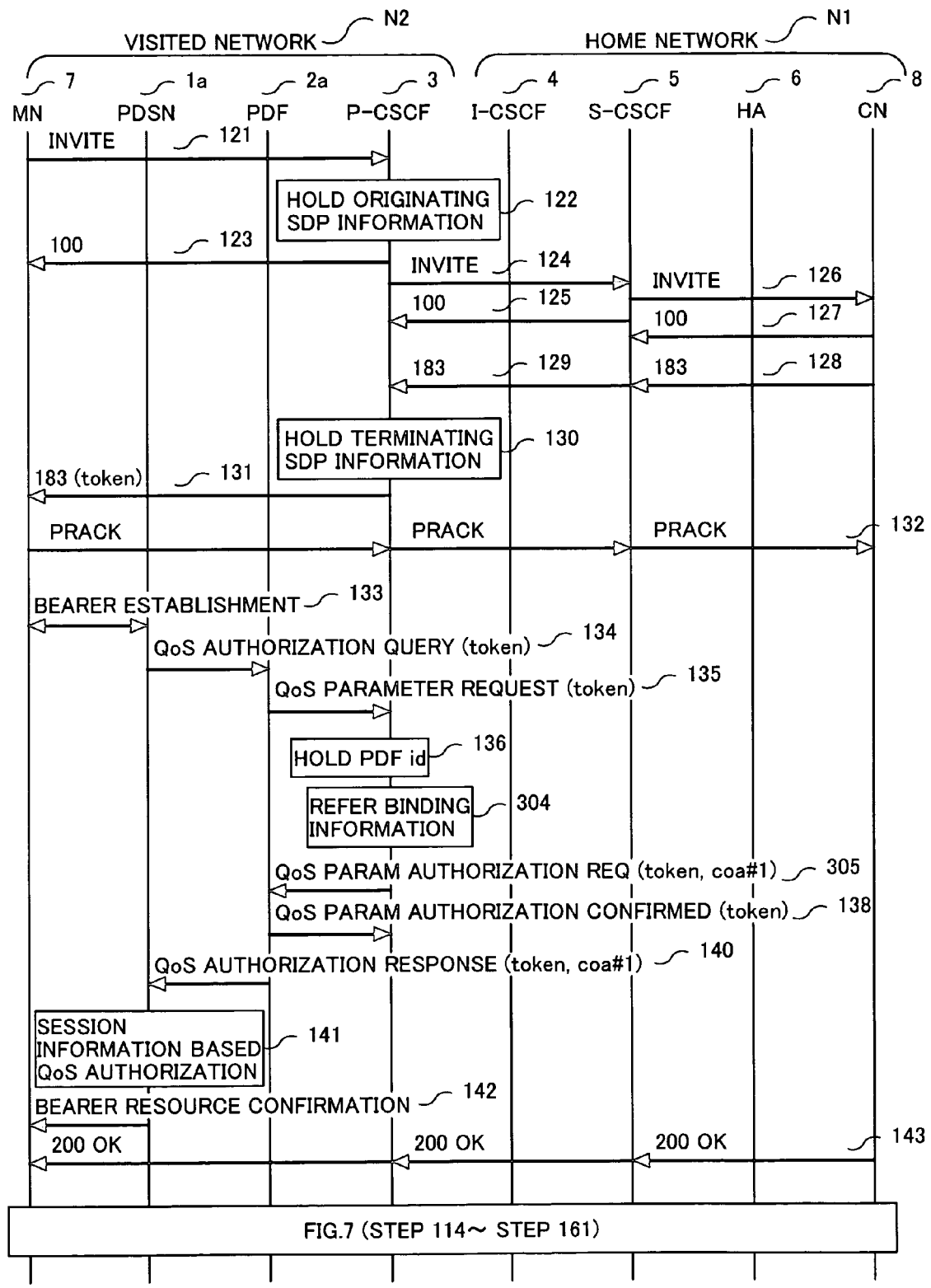
FIG. 19 is a diagram of a transmission sequence in the second embodiment.

Next, according to a sequence shown in FIG. 19, a procedure in which the MN 7 makes transmission to the communication Correspondent Node terminal (CN) 8 in the second embodiment will be explained. A procedure of Step 121 to Step 136 is the same as the first embodiment. After storing the PDF id (Step 136), the P-CSCF 3 reads the caller media information 804-807 and the callee media information 808-811 from the corresponding entry of the session information management table 870. Next, the P-CSCF 3 refers to the MN information management table 820 by using the home address of the MN 7 stored in the IP address of the caller media information as a search key (Step 304). The P-CSCF 3 acquires the Care of Address (coa#1) of the MN 7 from the entry 820-1 stored in Step 302, and sets the CoA existence flag 871 of the session information management table 870 to "existence." Then, the P-CSCF 3 refers to the MN information management table 820 by using the IP address of the callee media information as a search key. When the corresponding entry does not exist in the MN information management table 820, the P-CSCF 3 sets the CoA existence flag 872 of the session information management table 870 to "nonexistence."

The P-CSCF 3 transmits the QoS Param Authorization Request in which caller IP address information is set to the Care of Address (coa#1) of the MN 7 to the PDF 2a (Step 305). In Step 305, the Care of Address (coa#1) of the MN is notified to the PDF 2. After transmitting the QoS Param Authorization Confirmed to the P-CSCF 3 (Steps 94, 138), the PDF 2 updates the QoS information management table 830 in the same procedure as the first embodiment (Step 95). Since the PDF 2 in the second embodiment does not have the MN information management table 210, the PDF 2 transits to Step 97 without referring to the Binding information. A procedure (from Step 140 to Step 161) after this until the MN 7 starts communication with the CN 8 is the same as the first embodiment. The PDF 2 sets a parameter of Step 140 to the Care of Address (coa#1) of the MN 7, whereby the PDSN 1 can use the Care of Address (coa#1) as QoS parameters.

Figure 20:
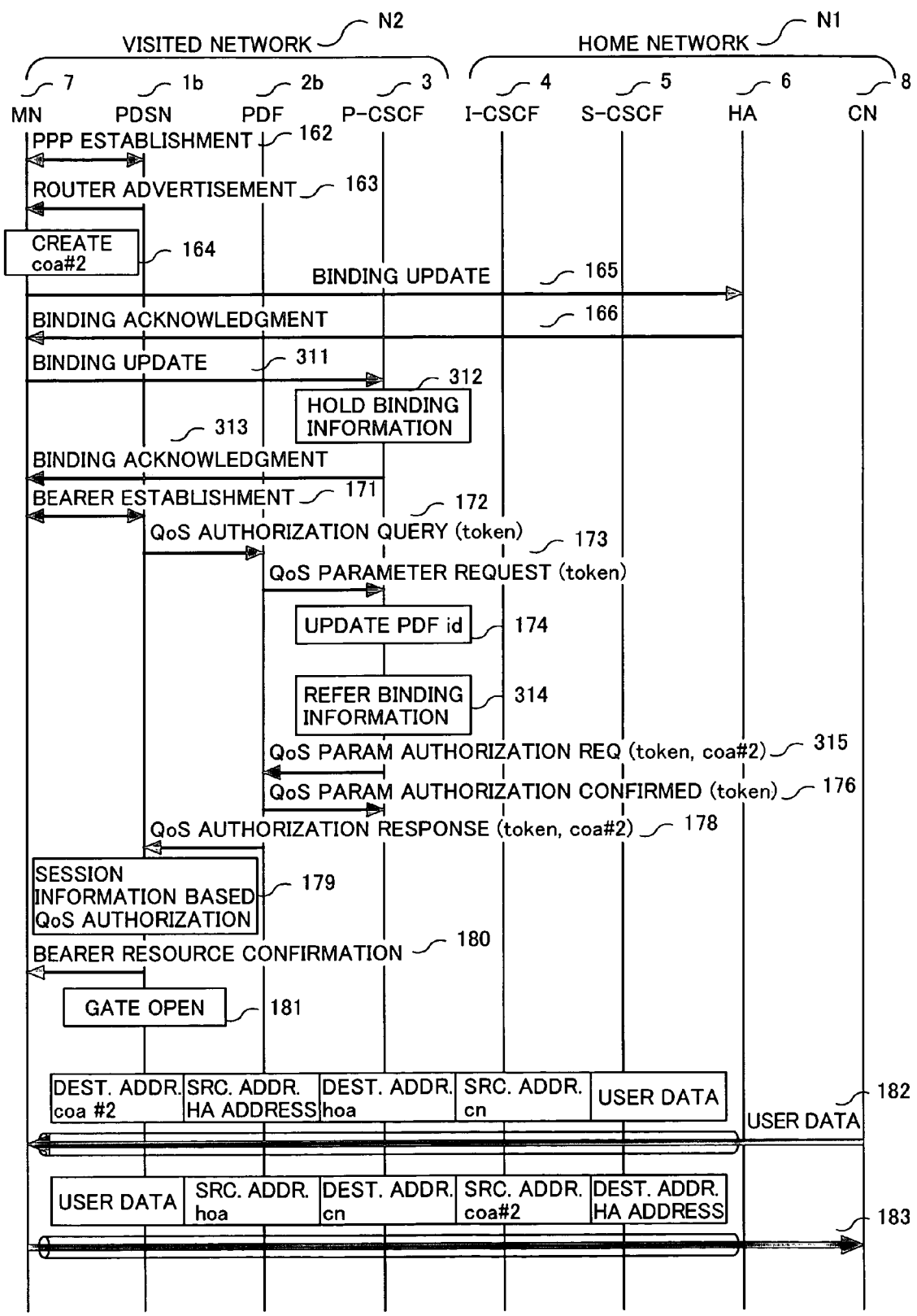
FIG. 20 is a diagram of registration and transmission sequences in the second embodiment.

Following the above, a procedure in which the MN 7 that performed registration and establishment of a session performs handoff between the PDSNs in the second embodiment will be explained according to a sequence shown in FIG. 20. A procedure of Step 162 to Step 166 is the same as the first embodiment. The MN 7 notifies the P-CSCF 3 of a new Care of Address (coa#2)(Step 311). The P-CSCF 3 refers to the MN information management table 820 by using the home address of the MN 7 as a search key. The P-CSCF 3 detects the entry 820-1 generated in Step 302 and updates the Care of Address information of the MN 7 (Step 312). The P-CSCF 3 transmits the Binding Acknowledgment to the MN 7 (Step 313).

By the above steps, the P-CSCF acquires the new Care of Address (coa#2) from the MN 7. It becomes possible for the P-CSCF to set the QoS parameter that will be transmitted to the PDF to the Care of Address (coa#2). A procedure of Step 171 to Step 174 is the same as the first embodiment. After the P-CSCF 3 updated the PDF id (Step 174), the P-CSCF 3 reads the caller media information 804-807 and the callee media information 808-811 from the corresponding entry of the session information management table 870. Next, the P-CSCF 3 refers to the MN information management table 820 by using the home address of the MN 7 stored in the IP address of the caller media information as a search key (Step 314). The P-CSCF 3 acquires the Care of Address (coa#2) of the MN 7 from the entry 820-1 updated in Step 312, and sets the CoA existence flag 871 of the session information management table 870 to "existence." Then, the P-CSCF 3 refers to the MN information management table 820 by using the IP address of the callee media information as a search key. When the corresponding entry does not exist in the MN information management table 820, the P-CSCF 3 sets the CoA existence flag 872 of the session information management table 870 to "nonexistence."

The P-CSCF 3 transmit the QoS Param Authorization Request in which caller IP address information is set to the Care of Address (coa#2) of the MN 7 to the PDF 2b (Step 315). The PDF 2 receives the QoS Param Authorization Request containing the Care of Address. The PDF 2b updates the QoS information management table 830 (Step 95) in the same procedure as the first embodiment after transmitting the QoS Param Authorization Confirmed to the P-CSCF 3 (Steps 94, 176). Since the PDF 2 in the second embodiment is not equipped with the MN information management table 210, the PDF 2 shifts to Step 97 without referring to the Binding information.

A subsequent procedure (from Step 178 to Step 183) is the same as the first embodiment. The above processing enables the PDSN 1 b to use the Care of Address coa#2 of the MN 7 as conditions of packet priority control and packet filtering at the time of packet forwarding. That is, the PDSN becomes able to provide QoS control according to the Care of Address of the MN 7. Incidentally, the PDSN 1 and the PDF 2 may be realized with the same communication equipment in the second embodiment. Alternatively, the PDF 2 and the P-CSCF 3 may be realized with the same equipment in the second embodiment.

According to the second embodiment of this invention, the P-CSCF 3 acquires the Binding information of the MN, whereby the PDSN 1 is enabled to provide QoS control (for example: packet filtering and priority control) by using the Care of Address of the MN as QoS parameters without having a registration signal detecting function of the Mobile IP.

With the use of this invention, the communication equipment is enabled to provide QoS control according to the Care of Address (for example, packet filtering and priority control) to the Mobile-IP-compliant mobile terminal in the visited network. This invention may be used in the case where communication equipment in a communication network accommodating a Mobile-IP-compliant mobile terminal realizes a QoS communication service according to the Care of Address.

What is claimed is:

1. A communication system that is connected with a terminal and a server for managing location information of the terminal including a Care of Address of the terminal and a Home Address of the terminal, the communication system comprising a communication control apparatus, a first communication apparatus, and a second communication apparatus, wherein the server has a first receiver for receiving a location registration from the terminal and a first transmitter for transmitting a response of a location registration to the terminal, the first communication apparatus is connected between the terminal and the server and has a first control unit for detecting the location information of the terminal from the response of the location registration transmitted from the server to the terminal, a second receiver for acquiring the location information of the terminal, and a second transmitter for transmitting the location information to the second communication apparatus, and the second communication apparatus has a third receiver for receiving the location information from the first communication apparatus, a memory for storing the location information, a second control unit for receiving QoS information from the communication control apparatus upon receiving a session establishment request containing a QoS request from the terminal or the first communication apparatus, and a third transmitter for transmitting to the first communication apparatus an instruction to execute QoS control based on the Care of Address of the terminal of the location information in the memory and the QoS information received by the second control unit.

2. The communication system according to claim 1, wherein the location information is Binding information of Mobile IP, the server is a Home Agent of the Mobile IP, and the QoS information according to the location information contains a Care of Address.

3. The communication system according to claim 1, wherein the first communication apparatus is a Packet Data servicing node, the second communication apparatus is a Policy Decision Function apparatus, and the communication control apparatus is an SIP server.

* * * * *